United States Patent
Goedken

(12) 
(10) Patent No.: US 6,393,423 B1
(45) Date of Patent: May 21, 2002

(54) APPARATUS AND METHODS FOR ELECTRONIC INFORMATION EXCHANGE

(76) Inventor: James Francis Goedken, 1413 N. Larkspur La., Palatine, IL (US) 60067

( * ) Notice: Subject to any disclaimer, the term of this patent is extended or adjusted under 35 U.S.C. 154(b) by 0 days.

(21) Appl. No.: 09/289,154

(22) Filed: Apr. 8, 1999

(51) Int. Cl.⁷ .............................................. G06F 17/30
(52) U.S. Cl. ................................ 707/10; 707/5; 707/9; 707/100; 707/103
(58) Field of Search ......................... 707/1–10; 709/206

(56) References Cited

U.S. PATENT DOCUMENTS

| | | |
|---|---|---|
| 4,221,933 A | 9/1980 | Cornell et al. |
| 4,612,416 A | 9/1986 | Emerson et al. |
| 5,029,199 A | 7/1991 | Jones et al. |
| 5,093,918 A | 3/1992 | Heyen et al. |
| 5,095,480 A | 3/1992 | Fenner |
| 5,115,326 A | 5/1992 | Burgess et al. |
| 5,136,580 A | 8/1992 | Videlock et al. |
| 5,177,680 A | 1/1993 | Tsukino et al. |
| 5,245,532 A | 9/1993 | Mourier |
| 5,276,869 A | 1/1994 | Forrest et al. |
| 5,283,856 A | 2/1994 | Gross et al. |
| 5,293,250 A | 3/1994 | Okumura et al. |
| 5,333,266 A | 7/1994 | Boaz et al. |
| 5,361,256 A | 11/1994 | Doeringer et al. |
| 5,424,724 A | 6/1995 | Williams et al. |
| 5,428,784 A | 6/1995 | Cahill, Jr. |
| 5,487,100 A | 1/1996 | Kane |
| 5,493,564 A | 2/1996 | Mullan |
| 5,555,426 A | 9/1996 | Johnson et al. |
| 5,564,018 A | 10/1996 | Flores et al. |
| 5,612,957 A | 3/1997 | Gregerson et al. |
| 5,613,108 A | 3/1997 | Morikawa |
| 5,619,648 A | 4/1997 | Canale et al. |
| 5,627,764 A | 5/1997 | Schutzman et al. |
| 5,632,018 A | 5/1997 | Otorii |
| 5,633,916 A | 5/1997 | Goldhagen et al. |
| 5,634,005 A | 5/1997 | Matsuo |
| 5,644,571 A | 7/1997 | Seaman |
| 5,675,507 A | 10/1997 | Bobo, II |
| 5,717,914 A | 2/1998 | Husick et al. |
| 5,724,567 A | 3/1998 | Rose et al. |
| 5,822,526 A | 10/1998 | Waskiewicz |

(List continued on next page.)

OTHER PUBLICATIONS

Website of ALLEXPERTS.COM, http://www.allexperts.com, May 18, 1999.
Holland, "The buzz about Abuzz", Boston Business Journal, May 3, 1999.
Website of abuzz.com, http://www.abuzz.com, Jun. 2, 1999.
Luening, "Abuzz releases collaborative sofware," CNET News.com, May 14, 1999.
"New York Times site seeks to cash in on reader smarts," Bloomberg News, Jan. 19, 2000.
Mostafa, "Times Co. Digital Launches Abuzz.com," Editor & Publisher Online, Jan. 19, 2000.
Luening, "New York Times Acquires Abuzz," CNET New..com, Jul. 15, 1999.

Primary Examiner—Hosain T. Alam
Assistant Examiner—Anh Ly

(57) ABSTRACT

Methods and apparatus for facilitating information exchange between an information requestor and one or more information custodians via a network are provided. The information requestor creates an information request message and sends it to the apparatus. The apparatus then determines an appropriate information custodian based on predetermined categories and other information. Subsequently, the apparatus sends an answer request message to that information custodian. The information custodian replies to the answer request message with either an intermediate answer message or a reroute message. When an intermediate answer message is received, the apparatus sends a final answer message to the information requester. Optionally, the apparatus records some or all of the messages for subsequent retrieval.

31 Claims, 22 Drawing Sheets

U.S. PATENT DOCUMENTS

| | | |
|---|---|---|
| 5,937,161 A | 8/1999 | Mulligan et al. |
| 5,938,725 A | 8/1999 | Hara |
| 5,948,058 A | 9/1999 | Kudoh et al. |
| 5,974,412 A | 10/1999 | Hazlehurst et al. |
| 5,987,503 A | 11/1999 | Murakami |
| 6,038,541 A | 3/2000 | Tokuda et al. |
| 6,057,841 A | 5/2000 | Thurlow et al. |
| 6,108,691 A | 8/2000 | Lee et al. |
| 6,118,856 A | 9/2000 | Paarsmarkt et al. |
| 6,146,026 A | 11/2000 | Ushiku |
| 6,154,783 A | 11/2000 | Gilmour et al. |

Information Request Message → 18

| To: info@apparatus.com |
|---|
| From: John_Doe@isp.com |
| Subject: Animals/Bats |
| Question: How do bats see in the dark? |

Answer Request Message → 20

| To: Dr_McWilliams@zoo.edu |
|---|
| From: info@apparatus.com |
| Subject: Animals/Bats |
| Question: How do bats see in the dark? |
| Message ID: 123456 |

Reroute Message → 23

| To: info@apparatus.com |
|---|
| From: Dr_McWilliams@zoo.edu |
| Subject: Animals/Bats/Radar |
| Question: How do bats see in the dark? |
| Message ID: 123456 |

Intermediate Answer Message — 22

| | |
|---|---|
| To: info@apparatus.com | — 25 |
| From: Dr_McWilliams@zoo.edu | — 26 |
| Subject: Animals/Bats/Radar | — 27 |
| Question: How do bats see in the dark? | — 28 |
| Message ID: 123456 | — 29 |
| Short answer: Bats use sonar to "see" in the dark. | — 30 |
| Long answer: Bats bounce high frequency sound waves off objects and determine the objects shape and distance by how long the sound waves take to return. See http://www.bats.com/sonar for more info. | — 31 |

FIG. 7

Final Answer Message — 24

| | |
|---|---|
| To: John_Doe@isp.com | — 25 |
| From: info@apparatus.com | — 26 |
| Subject: Animals/Bats/Radar | — 27 |
| Question: How do bats see in the dark? | — 28 |
| Message ID: 123456 | — 29 |
| Short answer: Bats use sonar to "see" in the dark. | — 30 |
| Long answer: Bats bounce high frequency sound waves off objects and determine the objects shape and distnace by how long the sound waves take to return. See http://www.bats.com/sonar for more info. | — 31 |

FIG. 8

Message Map Database (118)

| Message ID | Subject | Information Requestor | Information Custodian | Asked | Answered | Response Variables |
|---|---|---|---|---|---|---|
| 123456 | Animals/Bats | John_Doe@isp.com | Dr_McWillimas@zoo.edu | 1/1/1998 | 1/1/1998 | |
| 123457 | Taxes | Requester@isp.com | Accountant@xyz.com | 1/1/1998 | 1/2/1998 | |
| 123458 | Computers | MIS_Dept@xyz.com | Orders@PCs.com | 1/1/1998 | 1/1/1998 | price < $1000 |
| 123459 | Bid/Switches | Buyer@xyz.com | Sales@Manufacturer.com | 1/1/1998 | null | maxResponses = lowestPriced5; deadLine = 2/1/98 |
| ... | ... | ... | ... | ... | ... | ... |

FIG. 11

Category Database (36)

| Category # | Aliases | Alternate Categories |
|---|---|---|
| 1000000001 | Animals/Bats; Animals/Bat; Animal/Bat; Animal/Bats; Bats<br>Commercial/Accounting/Income/Tax;<br>Commercial/Accounting/Income/Taxes;<br>Commercial/Accounting/Income Tax;<br>Commercial/Accounting/Income Taxes;<br>Commercial/Accounting/Tax/Income;<br>Commercial/Accounting/Taxes/Income;<br>Commercial/Accounting/Taxable Income;<br>Commercial/Accounting/Deduction;<br>Commercial/Accounting/Deductions;<br>Commercial/Accounting/Personal Deduction;<br>Commercial/Accounting/Personal Deductions;<br>Commercial/Accounting/Deduction/Personal;<br>Commercial/Accounting/Deductions/Personal;<br>Commercial/Accounting/Personal/Deduction;<br>Commercial/Accounting/Personal/Deductions;<br>Commercial/Accountant/Income/Tax;<br>Commercial/Accountant/Income/Taxes;<br>Commercial/Accountant/Income Tax;<br>Commercial/Accountant/Income Taxes;<br>Commercial/Accountant/Tax/Income;<br>Commercial/Accountant/Taxes/Income;<br>Commercial/Accountant/Taxable Income;<br>Commercial/Accountant/Deduction;<br>Commercial/Accountant/Deductions;<br>Commercial/Accountant/Personal Deduction;<br>Commercial/Accountant/Personal Deductions;<br>Commercial/Accountant/Deduction/Personal;<br>Commercial/Accountant/Deductions/Personal; | 1000001234; 1000005678; 1000002468; ... |
| 1000000002 | Commercial/Accountant/Deductions/Personal; | 1000003145; 1000003146; 1000003147; ... |
| ... | ... | ... |

FIG. 12

Category Database (36)

| Category # | Aliases | Alternate Categories |
|---|---|---|
| 1000000001 | Animal/Bat!; Bats | 1000001234; 1000005678; 1000002468; ... |
| 1000000002 | Commercial/Accounting||Accountant/Income,Tax||Taxes||Taxable; Commercial/Accounting/Deduction||Deductions||(Personal,Deduction||Deductions) | 1000003145; 1000003146; 1000003147; ... |
| ... | ... | ... |

FIG. 13

*Custodian Database (38)*

| Information Custodian | Category # | Variable(s) | Historical Statistical Data |
|---|---|---|---|
| Dr_McWilliams@zoo.edu | 1000000001 | questionFreq = 1/month; questionLevel = Novice | questionSent = 1/1/98, 2/15/98, 3/20/98,... |
| Accountant@xyz.com | 1000000002, 1000003145 | questionFreq <= 1.5/20days | questionSent = 1/1/98, 1/21/98, 3/1/98,... |
| Responder@business.com | 1000007733,... | questionPercent = 50; prefer (userAge > 20 and pcAge > 3yrs) | numberOfEmployees=75, netSales97=$100M |
| ... | | | ... |

FIG. 14

Knowledge Database (136)

| Category | ID # | Time stamp | Stale Date | Question / Question Synonyms | Short Answer | Pointer to Complete Message(s) | Information Requestor | Information Custodian |
|---|---|---|---|---|---|---|---|---|
| 1000000001 | 123456 | 1/1/1998 8:17:53 PM | 1/1/2003 | How do bats see in the dark?, Do bats have radar?, How do bats use radar?, ... | Bats use radar to "see" in the dark. | Knowledgebase/ 1000002314/123456/1 | John_Doe @isp.com | Dr_McWilliams @zoo.edu |
| 1000000002 | 123457 | 1/1/1998 3:17:53 PM | 1/1/1999 | Is depreciation on my car deductible?, Can I deduct the depreciation of my car? | It depends if you are using it for work. | Knowledgebase/ 1000000002/ 1000000001/1 | John_Public @isp.com | Accountant @xyz.com |
| ... | | | | | | ... | | ... |

FIG. 15

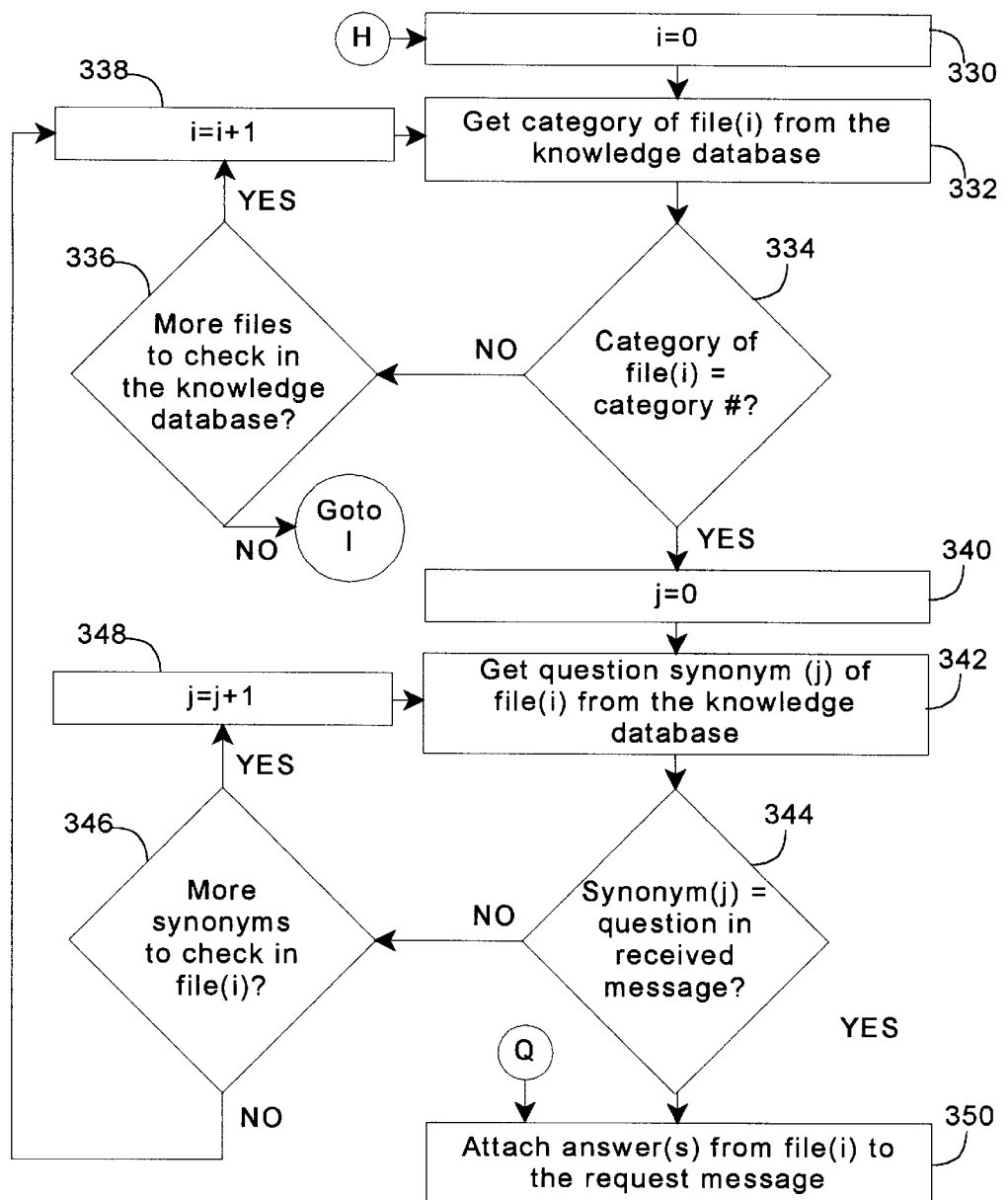
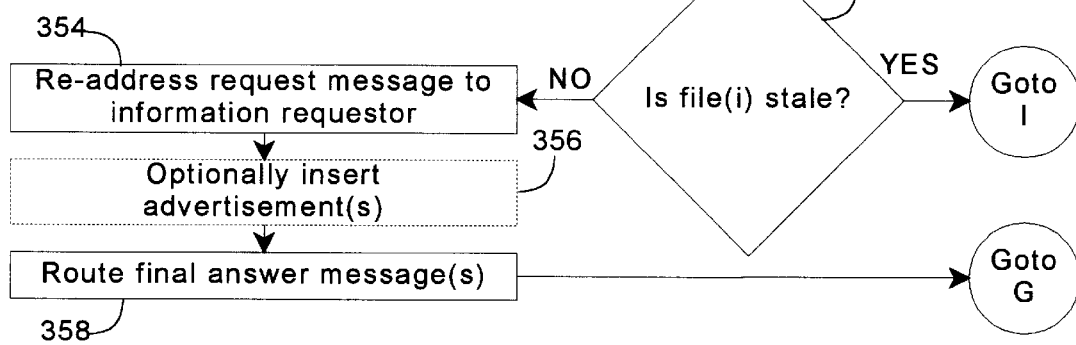
FIG. 18

APPARATUS AND METHODS FOR ELECTRONIC INFORMATION EXCHANGE

TECHNICAL FIELD OF THE INVENTION

The present invention relates in general to electronic information exchange and in particular to apparatus and methods for facilitating information exchange between an information requestor and an information custodian via a network.

BACKGROUND OF THE INVENTION

The Internet has been heralded as the "information superhighway", a place where a person can quickly obtain information about any of a large variety of topics. As is well known, a person can use a search engine to do a key word search for web pages containing information of interest. However, as any user of the Internet will readily appreciate, such searching is often frustrating. For example, after a long list of potential web sites of interest is compiled by the search engine, the searcher must often wander from page to page manually searching for information that may or may not actually be present, a time consuming, and possibly disappointing procedure.

As is well known, web pages and/or the code that generates them are fixed in time. In other words, web pages are created by individuals based on beliefs that the information placed in the page will be of interest to future, unknown readers. Such readers are typically not involved in the creation of the page. Thus, web pages tend to be "generalized" in the sense that they include substantial quantities of information that may be of interest to certain segments of the public, but they are not specifically tailored to the interests or information needs of any particular person. This generalist approach results in circumstances such as those described above; where an individual searching for an answer to a seemingly simple question must wade through pages of "general" information with little or no applicability to the subject question before finding an answer (if one exists in the compilation of general information developed by the search engine).

Often times a person exists who knows where to locate and/or has custody of the information that interests the searcher ("an information custodian"). For example, if the searcher wants to know how bats see in the dark, a zoologist with a specialty in bats could very likely recommend a web page on point and/or answer that question precisely and concisely in a matter of moments. However, in most instances the searcher does not know a zoologist, and is, therefore, relegated to searching through a list of web pages to find an answer. In short, while Internet searching is a powerful resource, it is often inferior to having the capability of posing a direct question to a human expert who can provide a direct answer.

Of course, networked environments such as the Internet do allow people to quickly and easily send messages directly to other people. For example, an electronic mail (e-mail) system allows an originator to send a message to a recipient. Typically, an e-mail message comprises text, but may also include graphics, audio clips, video clips, and/or other forms of communication. Typically, the originator composes the message on a personal computer (PC).

The amount and direction of logical message flow varies with the type of message(s) being sent. Often, a message flows logically from an originator to a recipient. For example, a mother might send her daughter a "happy birthday" message. Other times it is desirable to have a message flow from an originator to multiple recipients. For example, an employer might send a "meeting notice" message to several employees. Yet other times multiple related messages may flow from several originators to a single recipient. For example, each employee in the above example may respond to the "meeting notice" to indicate availability. Of course, many other combinations and examples are possible.

In a direct messaging system, the originator(s) addresses the message to the recipient(s) explicitly (e.g., To: John@example.com). In a grouped messaging system, the originator (and/or another person or persons) may pre-select certain addresses and combine them into a named group to facilitate addressing. For example, the employer in the above examples may define a "marketing" group with three addresses (e.g., marketing=Al@xyz.com, Bob@xyz.com, Cathy@xyz.com). In such an instance, the employer may simply address the meeting notice to "marketing", and the message will be sent to Al, Bob, and Cathy. Of course, group names and individual addresses could be used in combination.

In some systems the definition of certain groups is maintained independent of the originator. For example, if Al in the above example left the company, his address may be removed from the marketing group by the human resources department. In this manner everyone using the centrally defined groups is always using a consistent and recent version of the group's definition. Further, individual recipients may add and delete their own address from one or more groups to keep the group definitions current. For example, each employee interested in receiving messages about the company softball team could add his address to a "softball" group. Subsequently, the person organizing the softball team would simply addresses messages to "softball" without even knowing who was in the "softball" group. In fact, the originator may never know the identity of one or more recipients, if a recipient chooses to remain anonymous.

Well known list servers operate in this manner. Recipients add and delete their e-mail address from a central list, specific to a certain topic, by sending an e-mail message to a predefined address associated with that topic, wherein the body of the message contains a key word (e.g., "add", "remove", etc.). Subsequently, when originators send e-mail messages to another predefined address associated with that topic, the list server forwards the e-mail message to each person currently on the central list.

Similarly, well know discussion groups such as Usenet Newsgroups operate in essentially the same manner. An originator posts a message to a particular interest group. Typically the message includes a short subject field (e.g., web portals) and a body field (e.g., I think XYZ is the best portal because . . . ). Subsequently, multiple originators may post messages to the same interest group in response to the original message. Recipients periodically retrieve all the messages (or optionally just the new messages) posted in a particular group and read the ones they are interested in based on the subject field.

Many well known chat rooms and other "instant" messaging systems have many of the features of both direct and grouped messaging systems. Participants may enter "rooms" designated by topic (i.e., the address of the room). Subsequently, any and all participants may type messages which are then displayed on all other participant's screens. Similarly, participants may designate topics they are interested in by completing a personal profile. Then, other participants may contact similarly interested participants by searching a directory of potential participants. Participants wishing to engage in one-to-one conversations may enter private rooms and/or exchange e-mail addresses.

Although direct messaging and grouped messaging systems are very popular and have been around for a long time, these systems have several drawbacks. For example, when an originator has a specific question he wishes to have answered, it is often difficult to determine how to address the message containing the question. Further, responsiveness to information requests varies dramatically. Thus, even if the originator knows or discovers who to send his question to, there is no guarantee that he will receive an answer, particularly if the originator has no preexisting relationship with the person receiving the message. In other words, these systems are disadvantageous because they require an information requestor to know the address of a person (or group) who is both likely to know the answer and is willing to respond (i.e., an appropriate information custodian). These systems are also disadvantageous because they do not include an adequate database of previously asked and answered information requests to reference and thus lend themselves to redundant questioning.

A person's list of direct messaging addresses is typically limited to friends, family, business associates, etc. Relative to the overall number of potential information custodians (e.g., millions), the personal list is typically very small (e.g., hundreds). Accordingly, the information requestor may not know the direct address of an appropriate information custodian. As a result, many information requests may go unasked, remain unanswered, or get answered incorrectly. For example, a person wondering if they can make a certain tax deduction might not know an accountant. As a result he might decide to play it safe and end up paying more taxes than required. Or, he might ask an unqualified friend and end up following some bad advice. In this example, the information requester could locate an accountant (e.g., in the yellow pages or in an online directory), but for minor questions he is discouraged. The accountant will likely charge for the consultation and/or want to follow up with unwanted solicitation. Further, many questions do not lend themselves readily to a quick consultation with a professional (e.g., "How do bats see in the dark?).

Also, the information requestor may be uncomfortable asking certain questions of information custodians on his personal list. For example, asking a doctor friend about birth control may be inappropriate. Or, asking a coworker what a certain buzzword means may be embarrassing. Consequently, the person may operate at a deficiency without the knowledge or he may need to perform some time consuming research.

Similarly, in grouped messaging systems it is often difficult to determine which group(s) to include when addressing a particular information request message. If only a small number of groups are known by the information requester, he may not know a group containing an appropriate information custodian. On the other hand, if a relatively large number of groups is known by the information requestor, there may be significant ambiguity between the group names and/or significant overlap between the groups intended content. For example, the existing Usenet grouped messaging system contains approximately one thousand groups whose names contain the word "Microsoft". Many of these groups may be considered similar in both name and content, especially by an inexperienced user. For example, as of this writing, the Usenet system contains a group named "microsoft.public.win95" and a group named "microsoft.public.win95.general.discussion". There appears to be no difference between the types of messages contained in these two groups. Often, but not always, the same message is posted to both groups. A person wishing to perform a thorough search of the subject matter may be forced to consult more than one group; where he is burdened by a significant number of redundant messages. Further, the exact group name is required when addressing. the information request message. In other words, the information requestor must either know the correct group name or look it up (e.g., consult a list of group names). This is disadvantageous because, for example, a person's memory may fail and because consulting lists can be time consuming. Further, the consulted list may not adequately describe the intended subject matter of each group.

Even if a group containing an appropriate information custodian is determined, there is no guarantee that that particular group member will read the information requestor's message and supply an appropriate response. There may be hundreds of messages added to a group each day. Even a diligent retriever is unlikely to read and respond to a significant portion of the information request messages posted. There is little incentive to do so. On the other hand, several information custodians may respond to the same information request message, thereby duplicating efforts and wasting resources. Other members may respond in a derogatory manner (colloquially referred to as "flaming"), because they dislike beginners (colloquially referred to as "newbies") cluttering their message lists with novice questions.

To help eliminate novice and repetitive questions, some discussion groups publish an electronic document containing frequently asked questions and associated answers (commonly referred to as an "FAQ"). FAQs are useful. However, FAQs have several drawbacks. FAQs are difficult to locate, because they reside on thousands of different servers. Many centralized lists attempt to organize FAQs into a single directory, but these lists are perpetually out of date because FAQs come and go with some frequency, and, the lists are maintained manually.

Once an appropriate FAQ is located (assuming an appropriate FAQ exists), it may be difficult to locate a question within the FAQ similar to a particular information request message. FAQs are maintained manually. Accordingly, most questions do not make it into the FAQ, only the most frequently asked questions are recorded at the discretion of a person who volunteers to maintain the list. Further, FAQs typically consist of a text file or web page with no sophisticated search capabilities attached. The only way to locate a particular question in the FAQ (assuming the particular question exists) is to manually search, follow predetermined hyperlinks (e.g., an index or table of contents), or electronically scan for key words. In addition, if more than one FAQ potentially contains the question an information requestor seeks, the crude search must be repeated for each FAQ.

As a further example of the inadequacies of existing information exchange systems, consider an employee at a large corporation attempting to resolve a relatively uncommon question (i.e., the answer is not conveniently published). Frequently, an appropriate information custodian exists, often within the same company, but the potential advantage of leveraging the information custodian's knowledge is lost due to ineffective information exchange (i.e., the information requestor does not know who to ask). For example, assume the person is an automotive engineer attempting to determine if material A or material B is better suited for a particular component in his design. No industry or company standards exist regarding such a selection, and each material has certain advantages and drawbacks. If the engineer's circle of colleagues happens to include an individual who has previously visited a similar question in analogous circumstances and he realizes it, his task is greatly simplified by simply asking the colleagues opinion. On the other hand, if he is unaware of this particular colleagues expertise, or no such colleague exists, he will likely face time consuming research.

In another example, a child might wonder what the deepest spot in the ocean is and what lives there. Typically, the question will either go unanswered, or, it will be answered in very general terms (e.g., a paragraph in an encyclopedia with a water depth and a list of species). If the child knew a marine biologist willing to answer an occasional question, the process would be easier (i.e., no research) and the response could be richer (e.g., an MPEG file recently recorded by a remotely operated vehicle showing marine life at extreme depths, accompanied by a summary of their unique characteristics).

In summary, web pages and other electronic communication systems are designed for generalists, and, thus, often fail to quickly and precisely satisfy specific information needs. Search engines results can be over-inclusive, overwhelming, and may not contain the appropriate information. Direct and group messaging systems require previously established relationships and return varying results. Attempts to consolidate existing information have generally been disorganized, distributed and incomplete.

SUMMARY OF THE INVENTION

In accordance with an aspect of the invention, an apparatus is provided for facilitating information exchange between an information requestor and an information custodian via a network. The apparatus includes an input coupled to the network and a first database mapping a plurality of information custodians to a plurality of categories. The apparatus also includes a selector in communication with the first database and the input for identifying one of the categories in the plurality of categories as being associated with an information request message received via the input from an information requester and for selecting a subset including at least one information custodian from the plurality of information custodians. The at least one information custodian is associated with the identified category. The selector automatically selects the subset based on historical statistical data associated with the at least one information custodian in the subset. Additionally, the apparatus includes a router in communication with the selector for transmitting an answer request message including at least a portion of the information request message to the at least one information custodian via the network.

In accordance with another aspect of the invention, an apparatus is provided for searching for an individual having custody of information on a network. The apparatus includes a database mapping a plurality of individuals to a plurality of categories. It also includes an input coupled to the network for receiving an information request from an information requester. The information request is associated with one of the categories. The apparatus is also provided with a search engine cooperating with the input and the database for searching the database for at least one individual having custody of the requested information. Additionally, the apparatus includes a router for directing at least a portion of the information request to the at least one individual identified by the search engine.

In accordance with still another aspect of the invention, an apparatus is disclosed for facilitating information searching on a network. The apparatus includes an input coupled to the network, and a first database mapping information requests to information replies. The apparatus is further provided with a first search engine cooperating with the first database for searching for a first information reply to an information request from an information requestor received via the input. It also includes a second database mapping a plurality of information custodians to a plurality of categories, and a second search engine cooperating with the second database. The second search engine is responsive to an unsuccessful search by the first search engine to identify one of the plurality of categories as being associated with the information request and to search the second database for an information custodian for developing a second information reply to the information request. Moreover, the apparatus includes a router cooperating with the first and second search engines. The router is responsive to a successful search by the first search engine to direct the first information reply from the first database to the information requestor and is responsive to the second search engine for directing at least a portion of the information request to the information custodian identified by the second search engine.

In accordance with yet another aspect of the invention a method is provided for facilitating electronic information exchange between at least one information custodian and an information requestor over a network. The method comprises the steps of: providing an exchange facilitating computing device having a first address on the network; defining a first category of information and a second category of information; and associating a first and a second information custodian with the first category. The first information custodian has a second address on the network which is different from the first address. The second information custodian has a third address on the network which is different from the first and the second addresses. The method also comprises the step of receiving an information request message indicative of a request for information from a first information requester at the exchange facilitating computing device via the network. The first information requester has a fourth address on the network which is different from the first, second and the third addresses. The method also includes the steps of determining whether the information request message is associated with the first category or the second category; if the information request message is associated with the first category, automatically selecting one of the first and second information custodians as a receiving custodian based on predetermined historical data; and routing at least a portion of the information request message from the first address to the receiving custodian.

Pursuant to still another aspect of the invention, a portal to the Internet is disclosed. The portal includes a first search engine which is responsive to a query received from a searcher to search for web sites associated with the query. It also includes a second search engine which is responsive to an information request from the searcher to search for individuals having custody of information associated with the information request. Further, a router is provided for directing at least a portion of the information request to at least one individual identified by the second search engine.

In accordance with still another aspect of the invention, an apparatus is disclosed for dynamically gathering and providing information via a network. The apparatus is provided with an input coupled to the network; a first database mapping information requests to information replies; a second database mapping a plurality of information custodians to a plurality of categories; and a search engine cooperating with the second database. The search engine is responsive to an information request received from an information requestor via the input to search the second database for an information custodian for developing an information answer message responsive to the information request. The apparatus is also provided with a router cooperating with the search engine for directing at least a portion of the information request to the information custodian identified by the search engine; and means for recording at least a portion of the answer message developed by the information custodian in the first database.

Pursuant to yet another aspect of the invention, an apparatus is provided for facilitating information exchange between an information requester and an information custodian via a network. The apparatus is provided with an input coupled to the network; a database mapping a plurality of information custodians to a plurality of categories; and a selector in communication with the database and the input. The selector is responsive to an information request message received from an information requestor via the input to automatically select a subset including at least one information custodian from the plurality of information custodians based on historical statistical data. The historical statistical data is associated with the at least one information custodian in the subset. The at least one information custodian is associated with at least one of the categories in the plurality. The at least one category is associated with the information request message. The apparatus is also provided with a router for transmitting an answer request message including at least a portion of the information request message to the at least one information custodian in the subset.

BRIEF DESCRIPTION OF THE DRAWINGS

These and other features and advantages of the present invention will become more apparent from a detailed consideration of the following detailed description of certain preferred embodiments when taken in conjunction with the drawings in which:

FIG. 4 represents an exemplary information request message, suitable for use as the information request message depicted in FIG. 1.

FIG. 5 represents an exemplary answer request message, suitable for use as the answer request message depicted in FIG. 1.

FIG. 6 represents an exemplary reroute message, suitable for use as the reroute message depicted in FIG. 1.

FIG. 7 represents an exemplary intermediate answer message, suitable for use as the intermediate answer message depicted in FIG. 1.

FIG. 8 represents an exemplary final answer message, suitable for use as the final answer message depicted in FIG. 1.

FIG. 11 is a table illustrating information that may be contained in the message map database depicted in FIG. 1.

FIG. 12 is a table illustrating information that may be contained in the category database depicted in FIG. 1 encoded using a first example format.

FIG. 13 is a table illustrating information that may be contained in the category database depicted in FIG. 1 encoded using a second example format.

FIG. 14 is a table illustrating types of information that may be contained in the custodian database depicted in FIG. 1.

FIG. 15 is a table illustrating information that may be contained in the knowledge database depicted in FIG. 1.

FIGS. 16–27 together comprise a more detailed flowchart of a program that can implement the apparatus of FIG. 1 to exchange electronic information.

DETAILED DESCRIPTION OF THE PREFERRED EMBODIMENTS

Although the following description focuses on people exchanging information using personal computers connected to the Internet, persons of ordinary skill in the art will readily appreciate that the techniques of the present invention are in no way limited to personal computers or the Internet. On the contrary, a user of any type of communication device connected to any type of network may benefit from the techniques shown herein. Further, persons of ordinary skill in the art will readily appreciate that elements other than the specific examples discussed below could be utilized to practice the present invention.

As will become apparent in the following description, the disclosed apparatus and methods capitalize on the greatest source of current information available, human knowledge, to provide a mechanism for obtaining information that is specifically tailored to a question at hand. Specifically, the disclosed apparatus and methods provide a mechanism for directing information requests to individuals who have the expertise to quickly provide thorough, responsive and accurate information. Thus, the need to plow through piles of irrelevant and/or off-point information in an effort to find needed information is eliminated. In short, the disclosed apparatus and methods locate the "needle of information" of interest to an information seeker without requiring the seeker to look through the "haystack" typically encountered in prior art searchable information networks.

Overview

Figure 1:
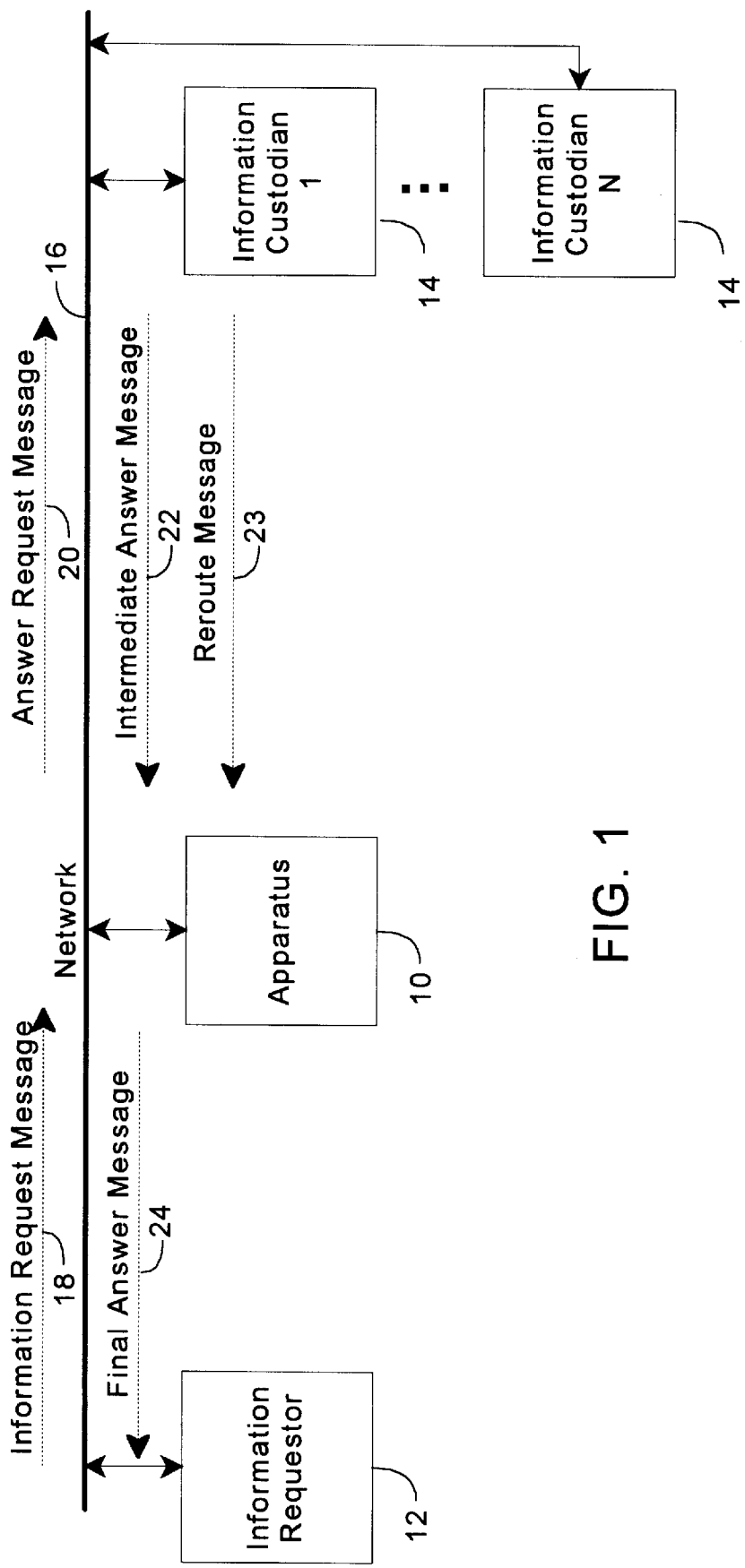
FIG. 1 illustrates an apparatus constructed in accordance with the teachings of the invention for facilitating information exchange between an information requestor and an information custodian via a network.

An apparatus 10, constructed in accordance with the teachings of the invention, for facilitating information exchange between an information requestor 12 and one or more information custodians 14 via a network 16 is illustrated in FIG. 1. Although for simplicity of illustration, FIG. 1 shows only one information requester 12, persons of ordinary skill in the art will readily appreciate that any number of information requestors 12 can utilize the apparatus 10 without departing from the scope or spirit of the invention. In operation, an information requester 12 creates an information request message 18 seeking information such as an answer to a question and sends the composed message over the network 16 to the apparatus 10. The apparatus 10 then receives the request message 18 and selects an appropriate information custodian 14 for responding to the information request based on predetermined categories and other information as explained in detail below. Subsequently, the apparatus 10 sends an answer request message 20 over the network 16 to the identified information custodian 14 (e.g., forwards the information request message 18 or a portion thereof to the appropriate information custodian 14). The information custodian 14 replies to the answer request message 20 with either an intermediate answer message 22 (if he knows the answer), or a reroute message 23 (if, for example, he believes himself unable or unqualified to respond). Although the information custodian 14 could send the intermediate answer message 22 directly to the information requester 12, in the preferred embodiment the information custodian 14 replies over the network 16 to the apparatus 10. If the custodian 14 sends an intermediate answer message 22 to the apparatus 10, the apparatus 10 then sends a final answer message 24 via the network 16 to the information requestor 12 (e.g., forwards the intermediate answer message 22 or a portion thereof to the information requester 12). Preferably, the apparatus 10 records some or all of the messages for subsequent retrieval and use as explained in detail below.

As also explained in detail below, the disclosed apparatus 10 may be adapted to facilitate information exchanges of general or academic interest (e.g., "How do bats see in the dark?") and/or of commercial interest (e.g., to solicit bids to purchase or sell goods and/or services). Thus, while "information request messages" 18 and "answer request messages" 20 may comprise one or more questions seeking one or more answers about a topic of interest, they may also be a bid request (e.g., a request for an offer to sell or buy goods or services) which seeks to find a buyer or a seller for a particular type of commercial transaction of interest without departing from the scope of the invention. Similarly, while "intermediate answer messages" 22 and "final answer messages" 24 may comprise an answer to a question, they may also comprise an offer to buy or sell, or an acceptance of an offer to buy or sell, goods or services without departing from the scope of the invention.

Figure 2:
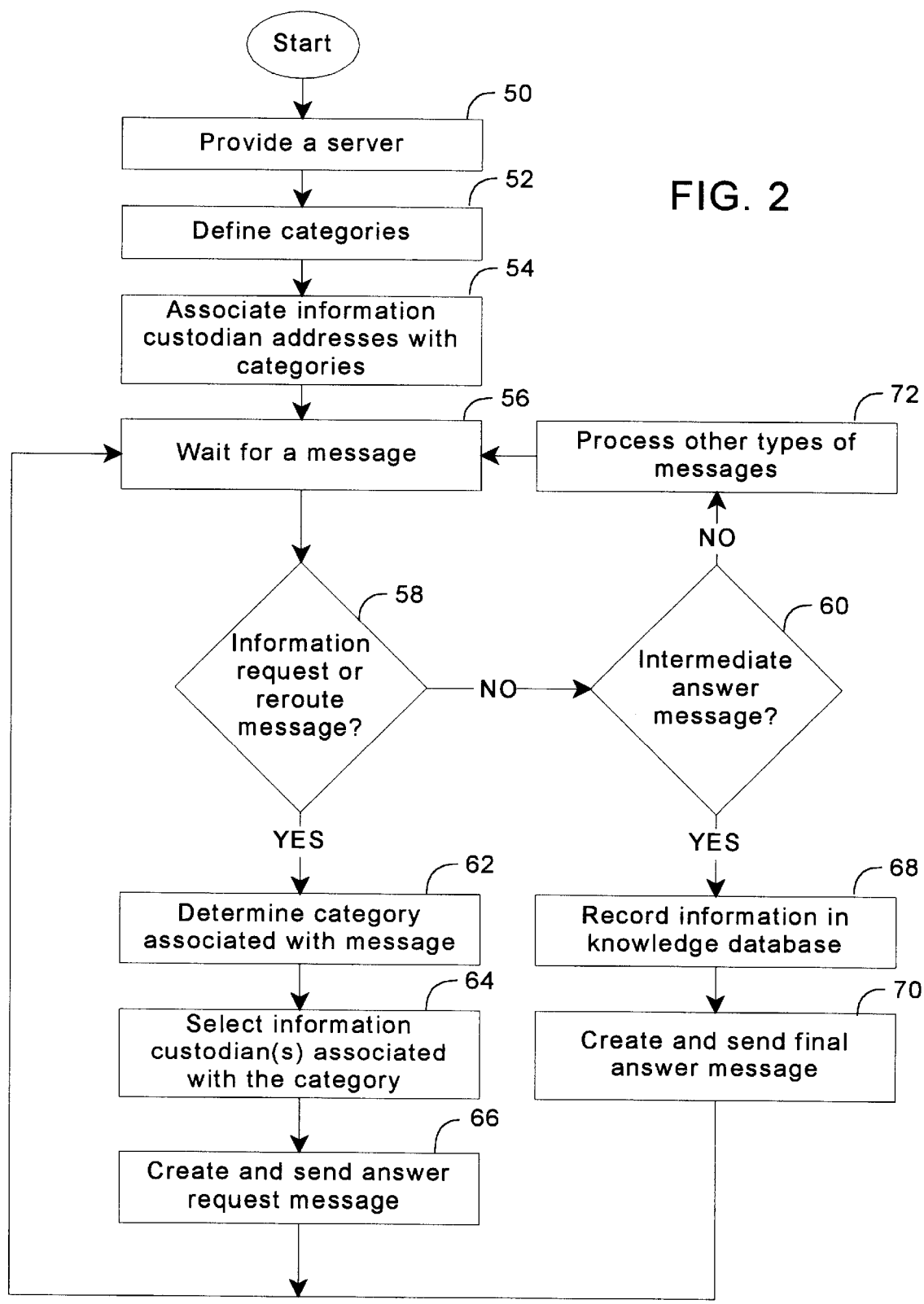
FIG. 2 is a flowchart of a program that can implement the apparatus of FIG. 1 to exchange electronic information.

A flowchart illustrating a method of exchanging electronic information in accordance with the teachings of the present invention is illustrated in FIG. 2. The method begins by providing one or more exchange facilitating computing devices 10 with one or more addresses on a network (e.g., a server with an Internet Protocol address programmed to perform the steps described in detail below) (block 50). A plurality of initial, preferably general, categories (e.g., animals, baseball, accounting, etc.) are then defined (block 52), and the addresses of a plurality of information custodians 14 are associated with the categories (e.g., John Doe with baseball, etc.) (block 54).

The remaining steps of the method (blocks 56–72) are preferably performed by the apparatus 10. The steps are typically executed by a control circuit such as a microprocessor of a server as is conventional. Once the program is initiated the control circuit waits to receive a message from the network 16 (block 56). When a message is received, the control circuit determines if the message is an information request message 18, a reroute message 23, or an intermediate answer message 22 (blocks 58 and 60). As indicated in FIG. 1, an information request message 18 is a message sent from a requestor 12 to the apparatus 10. It generally contains a request for information about a particular topic (e.g., an academic question, a bid, an offer, etc.). Preferably, the information request message 18 will be as specific as possible. An intermediate answer message 22, on the other hand, is a message from an information custodian 14 to the apparatus 10 which contains a reply to an earlier routed information request message 18 (e.g., an answer to a question, a bid, an offer, an acceptance, etc.). A reroute message 23 is a message from an information custodian 14 to the apparatus 10 requesting that an answer request message 20 be forwarded to a different information custodian 14. Reroute messages 23 will usually not contain a reply to the information request message 18. However, a reroute message 23 could contain a reply. Reroute messages 23 with replies might be useful in instances where the information custodian 14 wishes to have his reply verified by a second information custodian 14 before transmission to the requestor 12.

Returning to FIG. 2, if the message is an information request message 18 or a reroute message 23, the control circuit identifies a category with which the message is associated (block 62). Subsequently, the control circuit selects one or more information custodian(s) 14 associated with the determined category (block 64), and sends the information custodian(s) an answer request message 20 (block 66). The answer request message 20 preferably comprises at least some portion of the information request message 18. For example, it may contain all of the information request message 18 except for the identity of the requestor 12.

If the received message is an intermediate answer message 22 (block 60), then the control circuit preferably records at least some of the information associated with the intermediate answer message 22 in a database (block 68), and sends the information requester 12 a final answer message 24 (block 70). The final answer message 24 preferably comprises at least some portion of the intermediate answer message 22. For example, it may contain all of the intermediate answer message 22 except for the identity of the information custodian 14.

As shown in FIG. 2, the control circuit preferably also processes other types of messages (block 72), if desired. By way of example, not limitation, the apparatus 10 preferably processes category change messages. Such messages would, for example, request that a new category or sub-category be created and preferably, that the requestor of the new category be added to the new category or sub-category as an information custodian 14. As discussed further herein, this ability to add, combine, and delete categories "on the fly" makes the system 10 self generating and ensures that topics of interest are developed and sorted according to the knowledge and/or needs of those who know best, namely, the information custodians 14. By way of another example, an information custodian 14 may send a status change message requesting that he/she be added or deleted as a custodian 14 under one or more categories or subcategories. Such status change messages and category change messages can be processed automatically or routed to an administrator for review, approval, and/or modification prior to entry into the system, depending on the level of automation desired.

Information Request Message Creation

Figure 3:
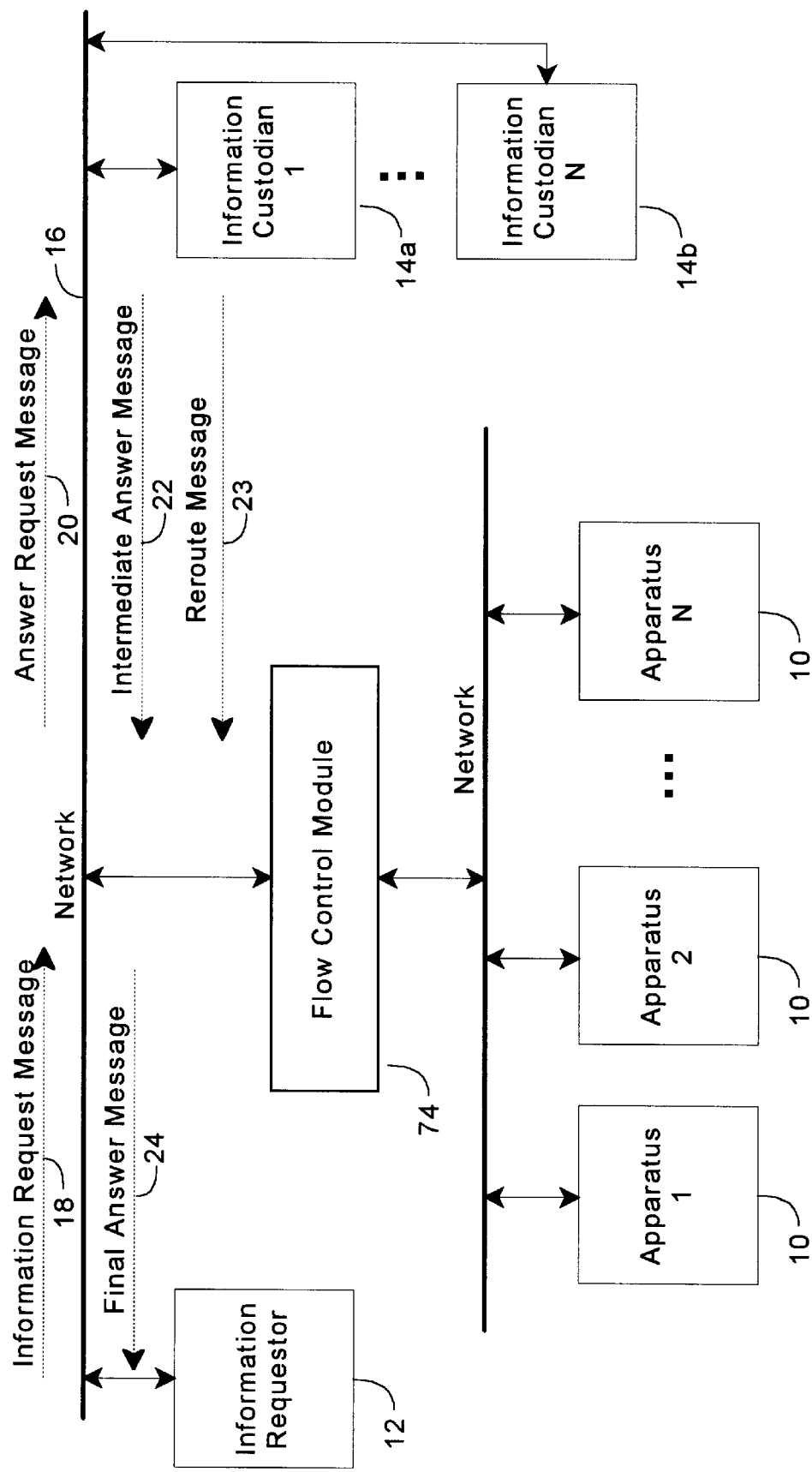
FIG. 3 is a schematic illustration of a preferred implementation of the apparatus of FIG. 1.

Preferably, the information requestor 12 writes the information request message 18 in the form of an e-mail message. In such an instance the e-mail message is preferably addressed to the apparatus 10 (e.g., To: info@apparatus.com) and preferably includes a return address associated with the requestor 12, a short subject identification, and a question pertaining to the identifying subject. A person of ordinary skill in the art will, of course, appreciate that more than one such apparatus 10 may exist, there may be one address or multiple addresses to which information request messages 18 may be sent, and that each address and/or apparatus 10 may be redundant or non-redundant. In the preferred embodiment, shown in FIG. 3, one apparatus address is used, but received messages are then routed by a flow control module 74 to one of several redundant apparatus 10 associated with the main apparatus address in order to reduce the computational overhead associated with any particular one of the apparatus 10.

Optionally, the selection of an apparatus 10 from the set of redundant apparatus 10 may be based on the content of the received message (e.g., different ones of the apparatus 10 may be dedicated to certain topics or categories). In such an instance, the address of the apparatus 10 could optionally supplement or replace the function of the subject field (discussed below). Alternatively, the subject field (or other information contained in the received message) could be used by the flow control module 74 to automatically determine an appropriate apparatus 10 for processing the message. However, persons of ordinary skill in the art will readily appreciate that the selection of a particular address from a group of redundant addresses need not be based on the content of the received message. Instead, such selection may be arbitrary or may be based (automatic or manual) on other factors such as physical location of the apparatus 10, data traffic conditions related to the apparatus 10, etc., without departing from the scope or spirit of the invention. Of course, a combination of redundant apparatus 10 and subject specific apparatus 10 could be employed without departing from the spirit of the present invention.

Although in the preferred embodiment, the information request message 18 comprises an e-mail message as explained above, persons of ordinary skill in the art will readily appreciate that information request messages 18 may also be composed by filing out an on-line form, such as a web page, without departing from the scope or spirit of the invention. In such an instance, the completed form (or the entries in the form) may be submitted to a server whose address is preferably embedded in the web page, and the addressing of the information request message 18 is preferably automatic (e.g., selecting a "submit" button executes software that directs the appropriate contents of the form to the appropriate address). Similarly, "instant" electronic messaging systems (e.g., chat rooms) may be used without departing from the scope or spirit of the present invention.

As shown in FIG. 4, in the preferred embodiment, the information request message 18 comprises a series of segments 25, 26, 27, and 28. Each segment preferably includes a label and a value. For example, segment 26 ("From: John_Doe@isp.com") includes the label "From" and the value "John_Doe@isp.com" delimited by the symbol ":". Of course, formats other than text may be used for some or all of a segment. Further, any type of delimiter may be used. In the preferred embodiment, only a few segments are necessary (e.g., To, From, Subject, Question). Many other segments are useful, but optional. Some segments may comprise a label with no value. In such an instance the value is, by default, "unidentified".

The information request message 18 preferably includes a segment 25 identifying the information requester 12. In the case of a typical e-mail message, this segment 25 is labeled "from" and is automatically supplied by the e-mail client the information requestor 12 is using (e.g., From: John_Doe@isp.com). In the case of a web page, a cookie or other identification file may be retrieved to identify the information requestor 12. Many other methods of identifying a person sending a message are well known to persons of ordinary skill in the art and may be employed in this role without departing from the scope or spirit of the invention. For example, a digital signature may be appended to the information request message 18 in order to unambiguously verify the identity of the information requester 12. Alternatively, a user name and/or password could be required before sending an information request message 18 to an apparatus 10.

Optionally, segments containing profile data (not shown) may be included in the information request message 18. Profile data is data which helps categorize the information requester 12. For example, profile data could be a series of variable names with assigned values (e.g., userAge=25; pcAge=4 yrs, etc.). Profile segments may be contained in a field, in the body of the information request message 18, and/or attached to the information request message 18. Alternatively, some or all of the profile data may be retrieved from the information requestor's 12 computer (e.g., a cookie) or from a server based on the information requestor's 12 identification information. This profile information can be used to develop demographics information about the types of people utilizing the system 10. Such demographics information could be useful, for example, to sell advertising spots to third parties whose ads would be appended to processed messages (e.g., to final answer messages 24). This demographics information could also be used to target specific ads to users having specific profiles, rather than appending ads to the messages delivered to all users.

In the preferred embodiment, the information request message 18 also contains a "subject" segment 27 (see FIG. 4). The subject segment 27 preferably contains information categorizing the content of the information request message 18 (e.g., Subject: Animals/Bats). The subject segment 27 may contain information generally categorizing the content of the information request message 18 (e.g., Subject: Animals); specifically categorizing the content of the information request message 18 (e.g., Subject: Animals/Bats/Radar); or, not categorizing the information request message 18 at all (e.g., Subject: ). Of course many variations from the very specific to the very broad exist and all are within the scope of the present invention. A list of categories is preferably made available to the information requesters 12 (e.g., via a hierarchical menu of categories, or by searching in a category database), and information requesters 12 are preferably encouraged to categorize an information request message 18 as specifically as possible for faster response. However, information requesters 12 need not know or use an exact category. In fact, information requestors 12 may leave the subject segment 27 blank (it will then be treated as failing in the "unidentified" category). Final routing may be determined by a category alias and/or one or more information custodians 14, as described in detail below.

The subject segment 27 may be the standard subject field included by most e-mail clients or any other field. For example, the subject segment 27 may be contained in the body of the information request message 18. In such an instance, the subject segment 27 may be the entire body of the message; or, the subject segment 27 may be identified by location (e.g., the first line of the body of the information request message 18); or, the subject segment 27 may be identified in the body of the message with a label (e.g., Subject:).

Preferably, the information request message 18 also contains a question segment 28 (e.g., an information request) (see FIG. 4). The question segment 28 identifies the information that the information requester 12 is seeking (e.g., we offer to sell widgets for $3.00/each, we offer to buy widgets for $3.00/each, etc.). In the preferred embodiment, each information request message 18 contains a single text message (e.g., How do bats see in the dark?). However, persons of ordinary skill in the art will readily appreciate that any number of questions may be contained in a single information request message 18. For example, an information requester 12 may compose a short version of a question and a long version of the question, thereby facilitating message categorization (which is useful, for example, for subsequent retrieval) with the short version as well as clarifying the question with the long version. Similarly, multiple related or unrelated questions may be combined into a single information request message 18. Preferably, multiple unrelated question segments 28 would be associated with multiple subject segments 27. Further, persons of ordinary skill in the art will readily appreciate that formats other than text may be used for the question segment 28. For example, the question may include a graphic image. As a further example, an audio and/or video recording may be digitized and attached to an information request message 18 to form some or all of the question. Like all of the segments contained in any message type (18, 20, 22, 23, 24), the question segment 28 may be identified in a variety of known manners (e.g., a standard field included by an e-mail client, part or all of the body of the message, identified by location, identified with a label, etc.). Further, any or all of the segments may be contained in a separate file attached to, or otherwise associated with, the message.

Additional segments of information may further characterize the information request message 18, thereby targeting a particular kind of information custodian 14 and/or a particular style of answer. For example, by including a segment like "numberOfEmployees>500", an information requester 12 whose request for information comprises a request for bids may be seeking bids only from established companies. The apparatus 10 may use such a segment to rule out certain information custodians 14. Similarly, if the information requestor 12 wants a "simple answer" he might include a "questionlevel" segment set to a value indicative of his desire (e.g., questionLevel=Novice). In another example, the information request message 18 may contain a segment like "maxCustodians=10" to limit the number of answer request messages 20 sent to ten or "maxCustodiansByMarketCap=5" to limit the number of answer request messages 20 sent to the five largest companies available based on market capitalization. Further, a segment like "price<$10", might be used by the apparatus 10 to filter out certain intermediate answer messages 22 (as opposed to ruling out information custodians 14). Processing of these type of segments by the apparatus 10 is discussed in detail below.

Once the information requester 12 completes composition of the information request message 18, the information request message 18 is preferably transmitted to the apparatus 10. Preferably, the transmission is over a network 16, such as the Internet, or, in company specific applications, over an intranet. The apparatus 10 then captures the information request message 18 at an input 100 in a known manner.

Example Structural Implementation

Figure 9:
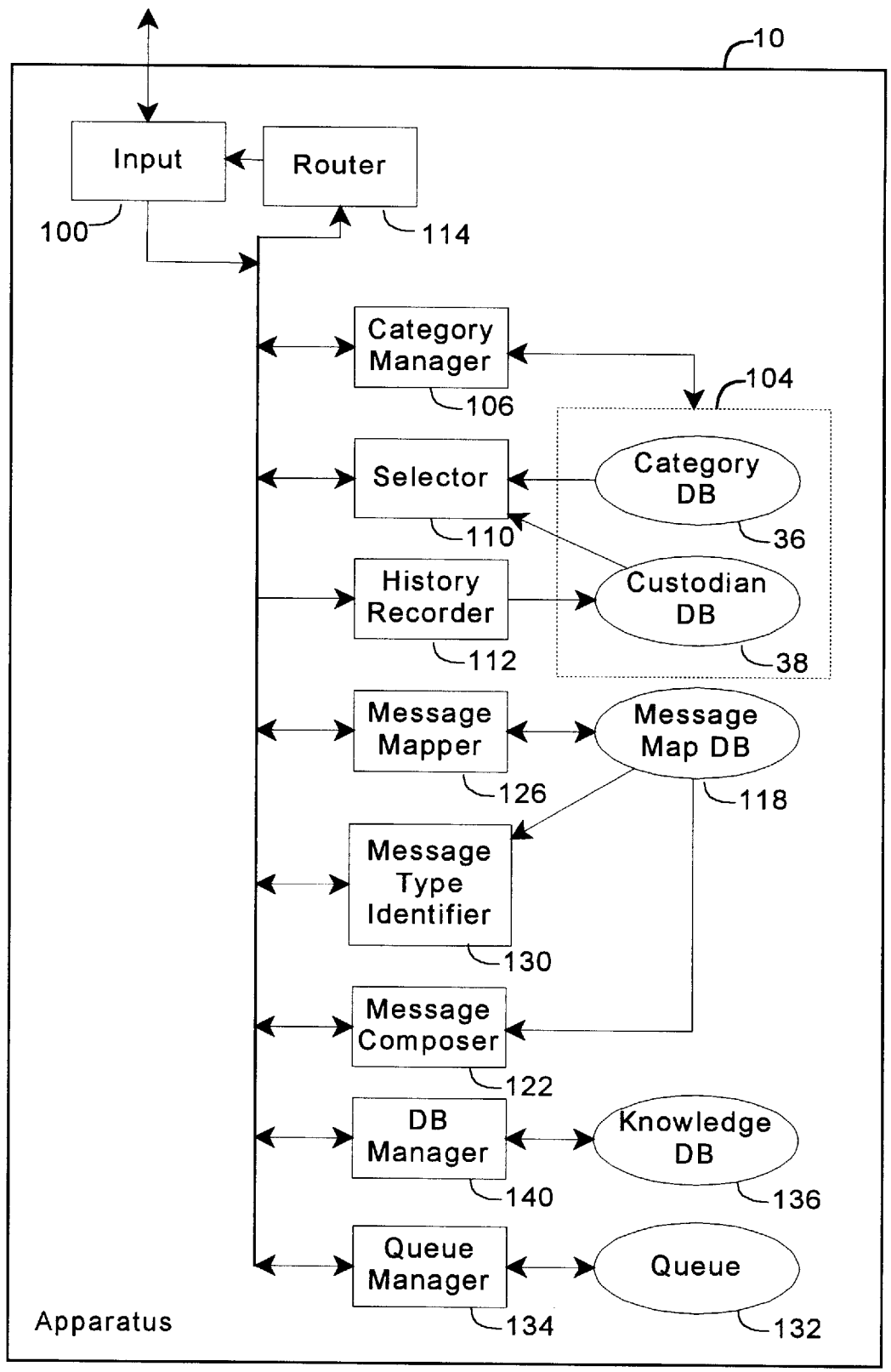
FIG. 9 is a more detailed schematic illustration of the apparatus of FIGS. 1 and 3.

A more detailed schematic illustration of an apparatus 10 constructed in accordance with the teachings of the invention is shown in FIG. 9. While in the preferred embodiment, each of the structures shown in FIG. 9 is implemented by software executing on a microprocessor unless otherwise noted, persons of ordinary skill in the art will readily appreciate that any or all of the structures could be implemented by hardware circuit(s) and/or firmware without departing from the scope or spirit of the invention.

For the purpose of coupling the apparatus 10 to a network such that the apparatus 10 can receive information requests 18, intermediate answer messages 22, reroute messages 23 and other miscellaneous messages, the apparatus is provided with an input device 100. While persons of ordinary skill in the art will readily appreciate that any conventional input device can be implemented in this role, the input device is preferably implemented by a gateway circuit. In embodiments such as that illustrated in FIG. 3 which employ multiple apparatus 10 coupled through a local area network or the Internet to a flow control module 74, the input device of the flow control module 74 is preferably implemented by a gateway circuit and the input devices of the individual apparatus 10 are preferably implemented by Ethernet adapter circuits. However, persons of ordinary skill in the art will readily appreciate that other conventional devices and/or connectors can be used to couple the flow control module 74 to the apparatus 10 without departing from the scope or spirit of the invention.

In order to deliver information request messages 18 to appropriate information custodians 14 in an efficient manner, the apparatus 10 is further provided with a category/custodian database 104. The category/custodian database 104 maps a plurality of information custodians 14 to a plurality of categories. In other words, it contains data indicating one or more associations between each of the information custodians 14 and one or more of the categories. For example, John Doe may be an information custodian 14 for the accounting category, whereas Jane Doe may be an information custodian 14 for both the bats category and the birds category. In any event, the associations are preferably utilized to identify an individual who is likely to have custody of information requested in a received information request message 18 as explained below. Preferably, the information custodians 14 are self defined. In other words, John Doe is in the accounting category because he has voluntarily placed himself there based on his personal belief that he has expertise in the accounting area. This categorization may be further limited by other variables as described in detail below (e.g., accounting questions from high school students).

Categories can be defined in any manner, but are preferably logically organized from the general to the specific. As explained in detail below, the categories are preferably user defined. Thus, as new information custodians 14 agree to participate in the system, new categories corresponding to the new participants' area(s) of expertise can be added. Similarly, when through use it becomes apparent that a category is too broad (e.g., animals), it can be broken down into sub-categories (e.g., bats, cats, dogs, etc.) to facilitate efficient information exchange.

For the purpose of updating the category/custodian database 104, the apparatus 10 is provided with a category manager 106. The category manager 106 is responsive to status change messages and category change messages to update the category/custodian database 104. In particular, when a status change message is received via the input 100, the category manager 106 updates the information in a record associated with the information custodian 14 transmitting the message in accordance with the instructions contained in the received status message. By way of examples, not limitations, the status change message may seek to change the network address of the sending custodian 14, may seek to delete the sending custodian 14 from one or more categories, may seek to add the individual originating the message as a new information custodian 14 in one or more categories, may seek to change one or more variables that effect the number of information request messages 18 routed to the sending information custodian 14, and/or may seek to add the sending individual as an information custodian 14 in one or more additional categories. The category manager 106 responds to such messages by changing the information custodian's 14 record in the database 104 such that the apparatus 10 processes future information request messages 18 potentially relating to the custodian 14 in accordance with the custodian's wishes.

A category change message such as a new category message, on the other hand, is processed by the category manager 106 to add a new category or sub-category to the database 104, optionally including at least the individual requesting the change as an information custodian 14 for that category. The category manager 106 is preferably adapted to automatically notify all information custodians 14 in any related categories via e-mail messages of any newly added sub-category to afford such custodians 14 an opportunity to enroll themselves as information custodians 14 under the new sub-category, to keep custodians 14 aware of other categories for rerouting purposes, and to give other custodians 14 an opportunity to object to any modification to the category list.

In some applications it may be desirable to place controls on who can change the category/custodian database 104. Specifically, in a perfect world, all possible transmitters of status change messages and/or category change messages would have pure and good intentions. However, in the world as it presently exists, there are vandals and other persons of ill intentions who might try to interfere with the operation of the apparatus 10 by disrupting the database 104. To avoid such efforts, it might be desirable to adapt the category manager 106 to only accept status change messages and/or category change messages that have been screened. In such circumstances, the category manager 106 would reroute any unscreened status change and/or category change messages (possibly identified, for example, by a failure to include a predetermined digital signature) to an administrator for examination and approval or disapproval.

For the purpose of searching the category/custodian database 104 for at least one individual having custody of information requested in an information request message 18 received via the input 100, the apparatus 10 further includes an information custodian search engine. In the illustrated embodiment, the information custodian search engine is implemented by a selector 110. As shown in FIG. 9, the selector 110 is preferably in communication with the category/custodian database 104 and the input 100. The selector 110 responds to received information request messages 18 by identifying a category associated with the information request message 18, by accessing the category/custodian database 104, and by selecting a subset of the information custodians 14 identified in the database 104 as being associated with the identified category for receipt of an answer request message 20. In question/answer applications, the subset will preferably include only one information custodian 14. In commercial transaction applications, the subset will preferably contain one or more information custodians 14.

Preferably, the selector 110 identifies the category associated with the information request message 18 by reading a predefined field in the received message. As explained above, the information request message 18 preferably comprises an e-mail message, but may alternatively be implemented in other ways such as by filling out an on-line form without departing from the scope or spirit of the invention. If the information request message 18 is an e-mail message, the category field can be identified by locating a predefined label such as "subject:" and reading the associated value (if present). If the information request message 18 is submitted via an on-line electronic form, the field may simply be defined in the form.

In any event, as explained above, if no subject or an unrecognized subject is located in the subject field 27, the selector 110 is preferably adapted to assume the category is "unidentified". In the preferred embodiment, at least one information custodian 14 will be associated with the "unidentified" category. The information custodian(s) 14 associated with this category will preferably agree to review such information requests 18 and to develop a reroute message 23 identifying a category for the request whenever possible. When such reroute messages 23 are received by the selector 110, the selector 110 executes the normal process of identifying the newly identified category, accessing the category/custodian database 104, selecting at least one information custodian associated with the category and forwarding an answer request message 20 to the selected custodian(s) 14. Of course, in some instances, the information request message 18 will truly not fit within an existing category. In such instances, the information custodians 14 associated with the "unidentified" category will develop an intermediate answer message 22 that either contains the requested information or that indicates that no information custodian 14 who can answer the request is currently available. In the event that there is no available information custodian 14, the message composer 122 preferably creates a "canned" final answer message 24 indicating that no information custodian 14 is available.

In many instances, more than one information custodian 14 will be associated with a given category. While in some commercial transaction applications, it will be desirable to contact more than one information custodian 14, in other applications (in both question/answer type and certain types of commercial transactions) it is desirable to contact only one custodian 14 or only custodians 14 meeting certain criteria. Thus, when an information request message 18 pertaining to such a category is received by the selector 110, the selector 110 may select a subset of the custodians 14 available in the category to receive an answer request message 20. The subset may, of course, be one or more custodians 14, but as used herein, means at least one member less than the entire set.

Persons of ordinary skill in the art will readily appreciate that the selector 110 can select the subset of custodians 14 in many ways without departing from the scope or the spirit of the invention. However, in the preferred embodiment, the selector 110 develops the subset based on historical statistical data associated with the information custodians 14 in the relevant category to which the information request message 18 pertains. Historical statistical data is any data concerning historical facts about the subject information custodians 14. By way of examples, not limitations, historical statistical data may comprise financial data (e.g., net worth, annual sales, number of employees, credit rating, etc.), or it may comprise usage information (e.g., the number of information request messages 20 forwarded to a particular custodian 14 over a time period of interest, the number of requests 20 ever answered by the subject custodian 14, the number of requests 20 currently awaiting an answer from the subject information custodian 14, etc.) In any event, the selector 110 can select the subset by evaluating the historical statistical data of interest in accordance with one or more selection variables. As will be appreciated by persons of ordinary skill in the art, the selection variables may be global variables set on a system wide basis, may be variables defined by the information requester 12 who authored the information request message 18, may be variables defined by the information custodian(s) 14 being considered for possible selection, and/or may be any combination of the above examples.

By way of examples, not limitations, the information requestor 12 may wish to define variables specifying the types of information custodians 14 that can receive and respond to the information request message 18. For instance, if the information request message 18 is a request for bids to supply widgets, the information requestor 12 may only wish to receive bids from manufacturers with annual sales above a certain threshold amount (e.g., $50,000,000) to ensure the bidders have adequate capacity and resources to fill the order should their bid be selected. Similarly, if the information request message 18 is an offer to sell widgets, the information requestor 12 may only wish information custodians 14 having acceptable credit ratings to receive the offer and possibly place orders. To facilitate such concerns, the selector 110 is preferably adapted to contact a database of information via an on-line connection to a remote, third party vendor (e.g., to contact Dun & Bradstreet), or to access a local database of information (e.g., financial data supplied by the participating information custodians 14). To these (and possibly other) ends, the selector 110 is preferably adapted to review any selection variables defined in the information request message 18 being processed, and to select the subset of custodians 14 to receive the answer request message 20 in accordance with the values of those variables. Persons of ordinary skill in the art will readily appreciate that, if desired, one or more of these variables can optionally be universal, in the sense that they apply to all information custodians 14 and are, therefore, not defined by the information requester 12. For example, the system can optionally be arranged to place restraints on the number of information request messages it will accept from any user within a given time period. This constraint can be enforced to prevent vandals from seeking to disrupt the system by "spamming", i.e., flooding the system with information requests 18 for which they do not really desire an answer.

As another example, the information custodians 14 may wish to place constraints on the number of answer request messages 20 they receive. For instance, an information custodian 14 may agree to answer a total of 10 questions. Once this number is reached, no further answer request messages 20 will be routed to that particular custodian 14 until he/she agrees to answer more questions and/or raises the limit. Similarly, the information custodian 14 may wish to define the maximum number of answer request messages 20 he/she may receive within a predefined time period, or, with a similar effect, to define a time period during which no more than a maximum number of answer request messages 20 will be routed to the information custodian 14. In other words, the selector 110 preferably acts as a means for limiting the number of answer request messages 20 routed to the individual information custodians 14. However, persons of ordinary skill in the art will readily appreciate the selector 110 may be used to enforce minimums or other criteria as well. To these (and possibly other) ends, the selector 110 is preferably adapted to review any selection variables defined in the record of the information custodians 14 associated with the category in question, and to select the subset to receive the answer request message 20 in accordance with the values of those variables. Persons of ordinary skill in the art will readily appreciate that, if desired, one or more of these variables can be universal, in the sense that they apply to all information custodians and are, therefore, not defined by the custodians 14 themselves without departing from the scope or the spirit of the invention.

For the purpose of supporting the usage limitation and other functions of the selector 110, the apparatus 10 is further provided with a history recorder 112. The history recorder 112 cooperates with the selector 110 to record the dates on which answer request messages 20 are forwarded to information custodians 14. In other words, if answer request message A is sent to information custodian John Doe on Jan. 1, 2000, the history recorder 112 updates the record of John Doe in the category/custodian database 104 to reflect this fact. As a result, when the selector 110 receives a subsequent information request message 18 pertaining to one of the categories with which John Doe is associated, the selector 110 will be able to review the data in John Doe's record to determine whether he should be excluded from the subset based on the maximum usage levels defined by the selection variables. Of course, the selector 110 could also examine the database to ensure any other desired usage requirements are enforced.

To enable. transmission of answer request messages 20, final answer messages 24 and other messages, the apparatus 10 is also provided with a router 114. The router 114 preferably cooperates with the category/custodian database 104 and/or the message map database 118 discussed below to retrieve a network address of the addressee to package and send a message (e.g., a final answer message 24) to the addressee via the input device 100 or, optionally, via a dedicated output device (not shown). By way of example, not limitation, in applications where the apparatus 10 is coupled to the Internet, the router 114 may function to package messages in accordance with the TCP/IP protocol before they are delivered to the Internet.

In order to create answer request messages 20 from information request. messages 18, to create final answer messages 24 from intermediate answer request messages 22, and to create intermediate answer request messages 20 from reroute messages 23, the apparatus 10 is provided with a message composer 122. The message composer 122 also preferably cooperates with the selector 110 and the router 114 to create answer request messages 20 from received information request messages 18 by optionally excluding one or more segments from the information request message 18 and readdressing the message to the information custodian(s) 14 contained in the subset developed by the selector 110. Preferably, at least the "From" segment 26 of the information request message 18 is excluded to preserve the anonymity of the information requestor 12. The message composer 122 preferably cooperates with the selector 110 and the router 114 to create and forward an answer request message 20 to one or more information custodians 14 by excluding one or more fields from a reroute message 23. Preferably, the identity of the information custodian 14 requesting the reroute is removed to preserve their anonymity. Similarly, the message composer 122 strips the identity of the information custodian 14 from received intermediate answer messages 22 and readdresses the message to the information requestor 12 to create a final answer message 24.

For the purpose of permitting correspondence between information requesters 12 and information custodians 14 while preserving their anonymity, the apparatus 10 is further provided with a message mapper 126. As shown in FIG. 9, the message mapper 126 cooperates with the message map database 118 to record the identities of the information requester 12 and the information custodian(s) 14 in association with the answer request message 20 and the final answer message 24 transmitted therebetween. Recording the identities of the corresponding parties in this manner enables the apparatus 10 to properly forward intermediate answer messages 22 to information requesters 12 and to forward follow-up information requests 18 from an information requester 12 to the same information custodian 14, if possible, without exposing the identity of the information requester 12 to the information custodian 14 or vice versa.

Preserving the anonymity of the correspondents by excluding their identities from the answer request message 20 and the final answer message 24 is advantageous because it protects both parties from unwanted solicitations. It is also advantageous because it ensures all communications are routed through the apparatus 10 thereby facilitating the information gathering process discussed below. Of course, if an information requestor 12 or an information custodian 14 does not wish to hide their identity, they can include it in the body of the message(s) they author.

As mentioned above, a number of different types of messages are received and processed by.the apparatus 10. To ensure that these messages are properly processed, the apparatus 10 further includes a message type identifier 130. The message type identifier 130 is preferably adapted to examine all incoming messages to determine their type. If the message type identifier 130 identifies a received message as an information request message 18, it preferably passes at least a portion of the message to the selector 110 and/or the message composer 122 to initiate preparation of one or more answer request messages 20. If the message type identifier 130 identifies the message as an intermediate answer message 22, it preferably passes at least a portion of the message to the message composer 122 to initiate preparation of a final answer message 24. If the message type identifier 130 identifies the received message as a reroute message 23, it preferably passes at least a portion of the message to the selector 110 and/or the message composer 122 to initiate preparation of a new answer request message 20. If the received message is identified as a status change message or a category change message by the message type identifier 130, the message type identifier 130 preferably routes the message to the category manager 106 for further processing as described above.

From the foregoing, persons of ordinary skill in the art will readily appreciate that the disclosed apparatus 10 functions to take advantage of the power of a network and the knowledge and specialized expertise of a participating collection of individuals to provide fresh, reliable information to interested searchers. In order to provide the apparatus 10 with the further function of dynamically gathering information from the participating information custodians 14, the apparatus 10 is further provided with means for recording at least a portion of the final answer messages 24 (e.g., certain segments of the intermediate answer messages 22) developed by the information custodians 14 in a knowledge database 136. As shown in FIG. 9, the recording means is preferably implemented by a database manager 140.

Preferably, the database manager 140 stores intermediate answer messages 22 received from information custodians 14 in association with the information request messages 18 to which they respond in the knowledge database 136. Preferably, the data stored in the knowledge database 136 is searchable such that, whenever an information request 18 is received by the apparatus 10, the database manager 140 conducts a search of the knowledge database 136 to determine whether an answer to the information request message 18 already exists. If so, the database manager 140 retrieves the answer from the database 136 and forwards it to the message composer 122 where the retrieved answer is formatted as a final answer message 24 for subsequent routing via the router 114 to the information requester 12. This process may occur without ever passing the information request message 18 to the selector 110 and, thus, without ever contacting an information custodian 14 with an answer request message 20. This feature is advantageous because it reduces the burden of repetitive questions on participating information custodians 14. On the other hand, if the database manager 140 does not locate an answer to the information request message 18, at least a portion of the information request message 18 may be passed to the selector 110 and/or the message composer 122 to initiate the preparation of an answer request message 20 to be routed to one or more information custodians 14 as explained above. Persons of ordinary skill in the art will readily appreciate, the apparatus 10 may alternatively check for a custodian 14 before polling the database 136 and/or route a retrieved answer (if one exists) to a custodian 14 for review amendment without. departing from the scope or spirit of the invention.

There are numerous ways to phrase the same question. To address this issue, the database manager 140 is preferably adapted to search for synonymous information request messages 18 in the knowledge database 136 using conventional searching techniques known in the art. As persons of ordinary skill in the art will appreciate, such searching techniques are not foolproof. Therefore, from time to time an information request message 18 will be routed to an information custodian 14 even though an answer to that information request exists in the database 136. To address this issue, information custodians 14 are preferably authorized to search the knowledge database 136 for pre-existing answers. If the custodian 14 finds such an answer, he/she is preferably authorized to add at least a portion of the current information request message 18 to the knowledge database 136 as a synonym of the previously stored request, and to prompt the database manager 140 to initiate the preparation of a final answer message 24 comprising the previously stored answer.

To further facilitate accurate storage and/or retrieval of answers in the knowledge database 136, information custodians 14 and or information requesters 12 are preferably encouraged to include question synonyms in their messages. For example, in response to a message from a first information requester 12 asking "How do bats see in the dark" (version 1), an information custodian 14 may include the question synonym "How do bats use radar?" (version 2). The answer may then be stored in the knowledge database 136 along with both versions of the question. Subsequently, a second information requestor 12 asking "How do bats use radar?" (version 2), may include the question synonym "How does bat radar work?" (version 3). Because version 2 from the second information requestor 12 is an exact match with version 2 stored in the knowledge database 136, retrieval of the pre-existing answer is simplified. In addition a new question synonym (version 3) may be recorded in the knowledge database 136 (i.e., "How does bat radar work?"). Preferably, when an information requestor 12 or information custodian 14 is manually searching the knowledge database 136, the most popular question synonym is displayed unless otherwise requested. Although in the example above the questions matched exactly (i.e., word for word), a person of ordinary skill in the art will readily appreciate that questions may "match" which are not "exact matches".

The answers to questions may change over time as, for example, science and technology progresses. Therefore, to prevent the knowledge database 136 from becoming stale, every stored answer is preferably date stamped with a currency date. If, after the expiration of a predetermined time period (e.g., one year) from the currency date, an information request message 18 which would ordinarily be answered with the stored answer is received by the apparatus 10, the database manager 140 will consider the stored answer "stale". As a result, instead of initiating the preparation of a final answer message 24 based on the stale stored answer, the database manager 140 cooperates with the selector 110 and the message composer 122 to prepare and send an answer request message 20 to one or more information custodians 14 seeking review and, if necessary revision, of the stale answer. Once the stale answer is reviewed by the custodian 14, its currency date is updated so that it will not be considered stale until another predetermined period of time has expired.

If desired, the time period before an answer in the knowledge database 136 is considered stale can vary from answer to answer and may be set by the information custodian 14 who last reviews the answer. However, to ensure answers do not inadvertently become stale due to overly optimistic estimations of the time period, it is preferred that a maximum time limit between reviews be imposed by the system such that, if an answer is recalled from the knowledge database 136, it will be no more than a predefined period (e.g., 5 years) since its last review by an information custodian 14 with expertise in the relevant area.

For the purpose of temporarily storing information request messages 18 when one or more information custodians 14 are not available to answer the request 18, a queue 132 and associated queue manager 134 are provided. If the selector 110 fails to locate the required number of information custodians 14, the queue manager 134 preferably stores the information request 18 in the queue 132. Subsequently, the queue manager 134 periodically retrieves pending messages 18 from the queue 132 and directs the selector 110 to re-attempt selection of the required number of information custodians 14. If after a number of unsuccessful attempts by the selector 110 to select an information custodian 14, the queue manager determines that a message has been pending for a predetermined period of time (e.g., 10 days), it directs the message composer 122 (in cooperation with the router 114) to notify the information requestor 12 that the time limit has expired. Preferably, the queue manager 134 deletes the corresponding record in the queue 132. The predetermined time period may be fixed for all messages or it may be defined by the information request message 18.

Figure 10:
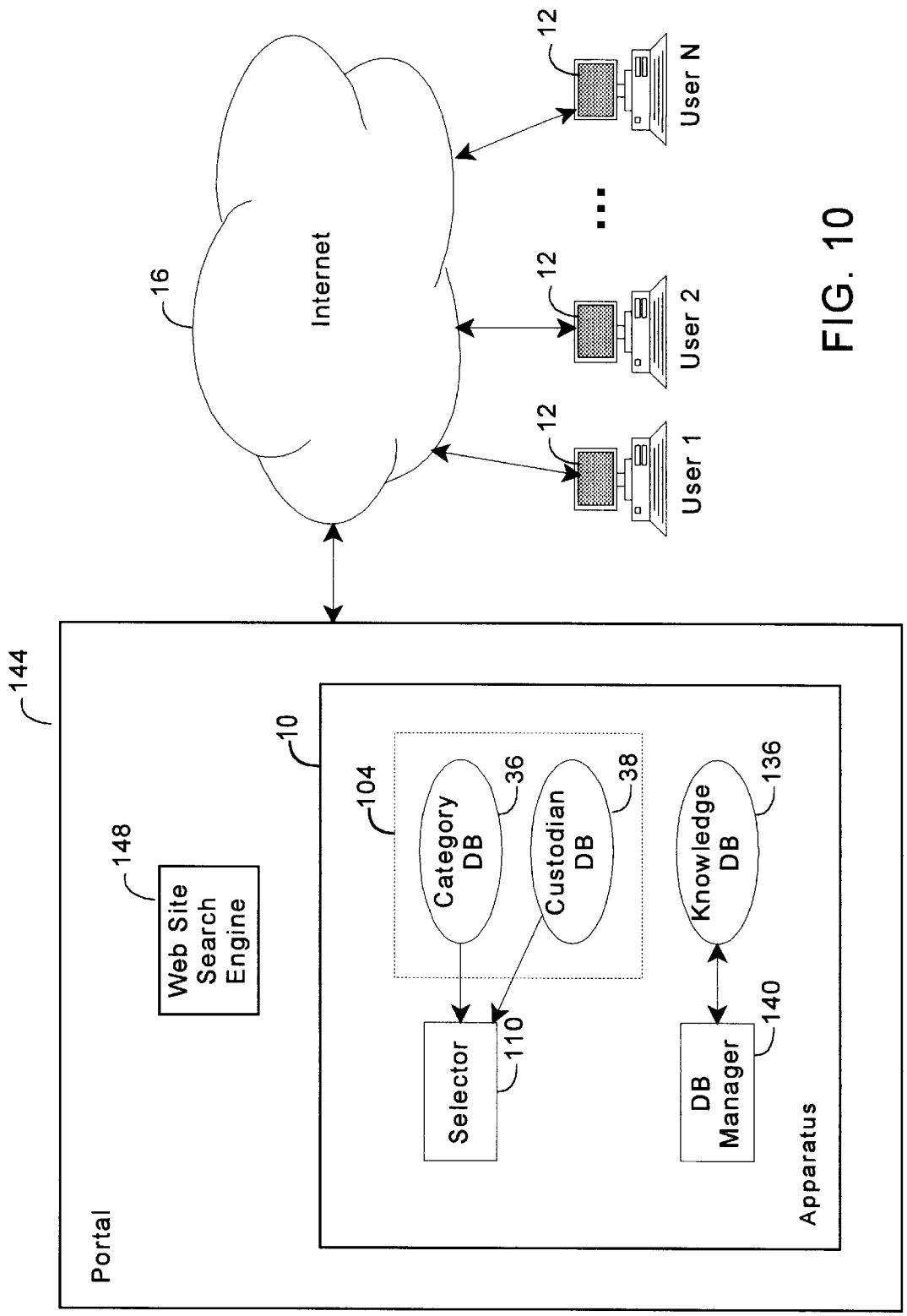
FIG. 10 illustrates a portal constructed in accordance with the teachings of the invention.

From the foregoing, persons of ordinary skill in the art will readily appreciate that the disclosed apparatus 10 (or portions thereof) can be advantageously incorporated into an Internet portal 144. As shown in FIG. 10, in such an implementation, the portal 144 preferably includes a first type of search engine 148 which is typically responsive to a query received from a searcher (e.g., user 1) to search for web sites having addresses on the Internet. The search engines of the various well known Internet portals including, by way of examples, not limitations, the Microsoft Network (MSN), Netscape, Yahoo, Alta Vista, Infoseek and America Online (AOL), are examples of this type of conventional web site search engine 148. As also shown in FIG. 10, the portal 144, additionally includes one or more apparatus 10. The apparatus 10 preferably includes a second type of search engine 110 which is typically responsive to an information request 18 from a searcher to search for individual(s) having custody of information associated with the information request 18 in the manner described above. The portal 144 may be configured to search for a web site if it cannot locate an eligible information custodian 14 and/or to search for an information custodian 14 if it cannot find a suitable web site.

Optionally, the apparatus 10 of the portal 144 can also be provided with a database manager 140 and a knowledge database 136 as described above. The database manager 140, which may include a third type of search engine associated with the portal 144, is responsive to information requests 18 from the searcher to search the knowledge database 136 for a reply to the information request 18. If the database manager 140 is unsuccessful in its search (e.g., it finds no reply or only a stale reply in the knowledge database 136), the second type of search engine at the portal 144, namely, the selector 110 of the apparatus 10, could be activated to initiate a search for an information custodian 14 that can reply to the information request 18 and/or the first type of search engine 148 could be activated to search for web sites having addresses on the Internet. If, on the other hand, the search of the knowledge database 136 conducted by the database manager 140 is successful, the selector 110 may not initiate a search for an information custodian 14 and/or a web site.

Detailed Disclosure of Exemplary Software Steps

As discussed above, although the apparatus 10 may be implemented by hardware, firmware, and/or software without departing from the scope or spirit of the invention, in the preferred embodiment, the apparatus 10 is implemented by software running on one or more servers. A detailed description of the preferred software implementation will now be discussed in connection with the flow charts appearing as FIGS. 16 through 27. Although for simplicity of discussion, these flow charts appear as, and will be discussed as, occurring in a particular time sequence, persons of ordinary skill in the art will readily appreciate that the software can be implemented in many ways, and the disclosed steps may be executed in many temporal sequences without departing from the scope or spirit of the invention.

Figure 16:
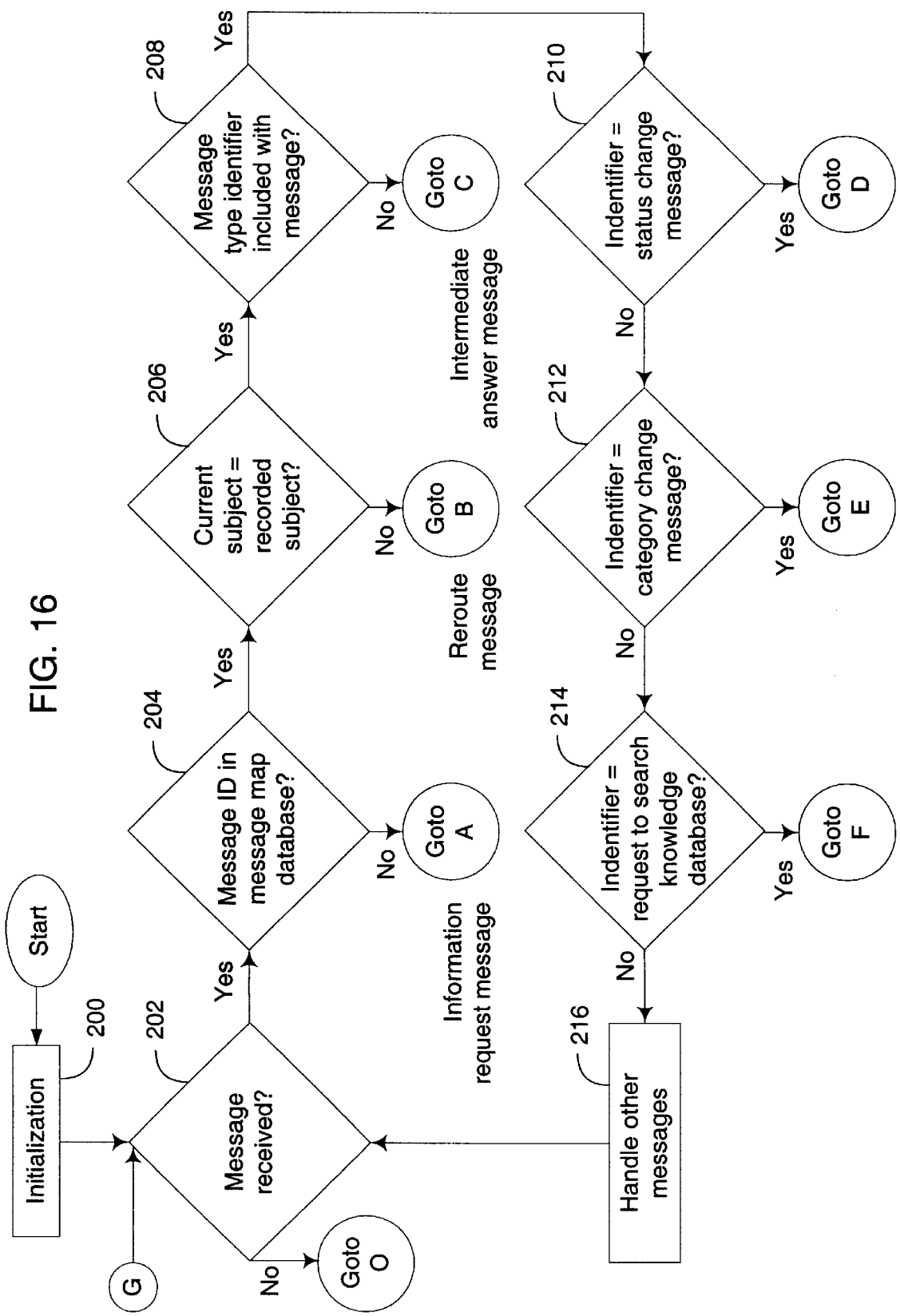

As shown in FIG. 16, the software implementing the apparatus 10 begins by performing various conventional housekeeping functions such as initializing variables, defining memories, loading routines into memory, etc. (block 200). Once these housekeeping steps are completed, the apparatus 10 preferably determines if a message has been received via the input 100 (block 202). If a message has been received, control passes to a series of decoding blocks 204–214 implementing the message type identifier 130. Decoding blocks 204–214 determine if the received message is an information request message 18 (block 204), a reroute message 23 (block 206), an intermediate answer message 22 (block 208), a status change message (block 210), a category change message (block 212), or a request to search the knowledge database 136 (block 214). If one of these message types is received, the apparatus 10 takes the appropriate action as discussed in detail below. However, if the received message is any other type of message, the apparatus 10 preferably executes other software routines to handle the messages at block 216. Regardless of the message type received, the apparatus 10 preferably returns control to block 202 after the received message has been processed. While waiting for the reception of another message, the apparatus 10 preferably handles tardy responses (blocks 470–482, FIG. 26) and pending requests (blocks 486–496, FIG. 27).

Information Request Message Identification

Preferably, the message type identifier 130 determines that a received message is an information request message 18 at block 204 by checking for a message identification code (e.g., an ID number). If the received message has no message identification code and/or the received message includes a segment identifying the message as an information request message 18, then the message type identifier 130 preferably determines that the received message is an information request message 18.

Assuming for the moment, that the received message is an information request message 18 (block 204), the message type identifier 130 preferably passes at least a portion of the message to the message mapper 126 in order to create a new record in the message map database 118. Preferably, the message mapper 126 generates a message identification code (e.g., a unique alpha-numeric string) and associates the message identification code with the information request message 18 (see FIG. 17). The generation of the message identification code is preferably performed by retrieving the first available code form a list of codes in the message map database 118 (block 300). Preferably, the message mapper 126 creates a message identification segment 29 by appending the retrieved message identification code to the information request message 18 with a label (e.g., Message ID: 123456). Alternatively, the message mapper 126 may set the value of an existing message identification code segment 29 to the message identification code.

Once the message identification code is selected, the message mapper 126 retrieves the subject and the requestor's address from the received message (block 302). The message mapper 126 preferably records the message identification code along with the information requestor's 12 identification information (e.g., his address), the value of the subject segment 27, and the date the question was asked in the message map database 118 (block 304) (see also FIG. 11).

Optionally, the system may support the evaluation of certain variables upon arrival of one or more responses which may be used to control the number or type of responses received by an information requestor 12. For example, the information requestor 12 may be soliciting bids and may wish to view only the lowest priced responses which are received before a particular deadline. In this optional embodiment, the message mapper preferably retrieves the response variables from the information request message 18 and records those variables in the message map database 118 in association with the message identification code for the information request 18 (block 306). Alternatively, the message mapper 126 may retrieve some or all of the response variables locally.

In an alternate embodiment, the information requester 12 generates a unique message identification code (e.g., an e-mail client generates a serial number) and includes it in the information request message 18. In such an instance, the message type identifier 130 determines whether the received message is an information request message 18 by searching a list of previously used message identification codes in the message map database 32. If the received message identification code is not in the message map database 32, then the message type identifier 130 assumes that the received message is an information request message 18. In such an instance, the message mapper 126 need not generate or append a message identification code, but instead uses the code provided by the requestor 12.

In another alternate embodiment, no message type identifier 130 is required. Instead information requestors 12 are required to send messages of different types to different apparatuses 10 by addressing each type of message with a different address. Each apparatus 10 then assumes the responsibility for one message type. This alternative approach is not preferred, because of the increased complexity and costs associated with maintaining multiple network addresses.

Category Identification

Returning to FIG. 17, the selector 110 processes the information request message 18 by retrieving the value in the subject segment 27 of the message 18 (and/or other information such as the question segment 28, any profile segments, and other targeting segments) to identify an appropriate response in the knowledge database 136 and/or to identify the address of an appropriate information custodian 14 (e.g., Dr_McWilliams@zoo.edu). Preferably, the selector 110 (which, as explained above is implemented as a search engine) reads the subject segment 27 and looks for a match in a category database 36 (see FIGS. 12 and 13). The selector 110 then selects appropriate information custodian (s) 14 by cross-referencing to a custodian database 38 by category number (see FIG. 14). Of course a single category/custodian database 104 mapping a plurality of information custodians 14 to a plurality of categories may be used.

In the preferred embodiment, several different strings of text, potentially appearing in the subject segment 27 (or elsewhere in the information request message 18), may all be indicative of the same category. Accordingly, one or more text strings may serve as an alias to a unique category number. In such an instance, many methods of encoding the aliases relationally with the category numbers are well known. For example, each alias could be exhaustively listed in a delimited list and associated with a cross referencing category number (see FIG. 12). Or, in order to conserve memory and/or decrease search time associated with the category database 36, a logical scheme and/or a compression scheme may be employed (e.g., FIG. 13 encodes the same information as FIG. 12). Of course, persons of ordinary skill in the art will readily appreciate that many other encoding schemes exist and that the category information need not be stored as text.

In the event that the selector 110 is unable to find a match in the category database 36 (e.g., nothing or an unknown string in the subject field), a default category is preferably identified and, as explained above, an answer request message 20 is sent to an information custodian 14 in the unidentified category who may re-route the message. Alternatively, information request messages 18 that are difficult to categorize may be returned to the information requestor 12, at which point the information requestor 12 may correct the categorization and re-send the information request message 18. Regardless of which approach is used, control returns to block 202 (FIG. 16) for receipt and processing of the next message once the current message has been routed.

Figure 17:
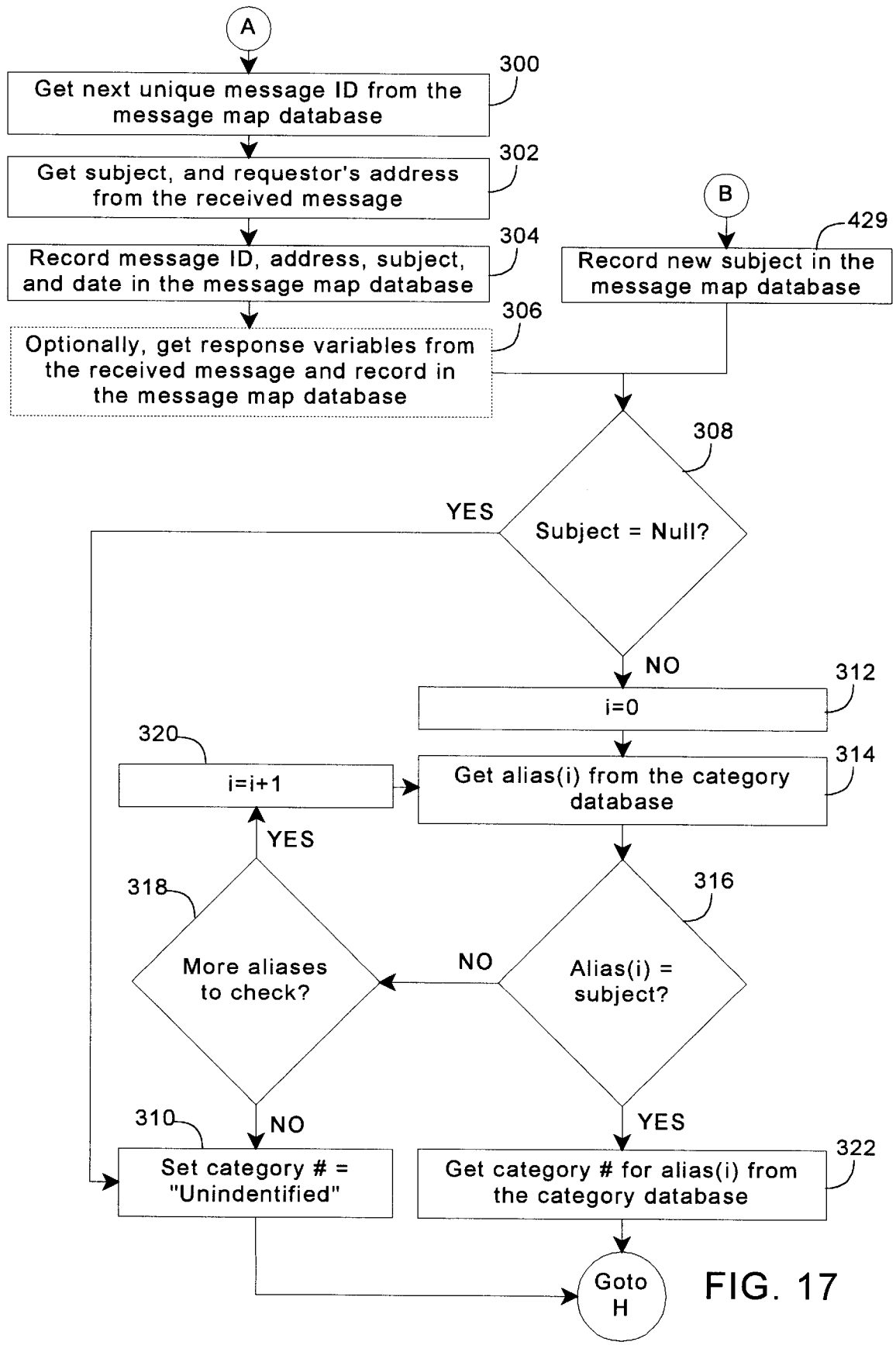

Turning specifically to FIG. 17 for a more detailed discussion of the operation of the apparatus 10, if the selector 110 cannot identify a subject segment 27 or if the value in the subject segment 27 of the received message 18 is null (block 308), control proceeds to block 310 where the selector 110 determines that the category for the received message 18 is "unidentified". If the subject segment 27 of the message 18, includes a non-zero value (block 308), the selector 110 enters a loop defined by blocks 312–322 where it attempts to identify the category specified in the message 18.

In particular, the selector 110 first sets a loop counter to zero (block 312). The selector 110 then retrieves the first possible alias from the category database 36 (block 314). The selector 110 then compares the retrieved alias to the value from the subject segment 27 of the information request message 18 (block 316). If there is a match, the selector 110 retrieves the category number associated with the current alias (block 322) and control proceeds to block 330 (FIG. 18). If the alias and subject do not match (block 316), the selector 110 determines if there are more aliases to consider (block 318). If not, the selector 110 sets the category number at "unidentified" (block 310) and control proceeds to block 330 (FIG. 18). Otherwise, the counter is incremented (block 320), the next alias is retrieved (block 314) and another comparison is made (block 316). The selector 110 continues to loop through blocks 314–320 until all of the aliases are compared to the subject value or until a match is found at block 316. If no match is found and the list of aliases is exhausted, the selector 110 designates the category as "unidentified" (block 310). If a match is found, the selector 110 designates the category number as that of the matched aliases. In either event, control proceeds to block 330 (FIG. 18).

Searching For Previously Stored Answers in the Knowledge Database

As mentioned above, it is desirable to avoid repeatedly asking information custodians 14 to answer the same question. The apparatus 10 achieves this desired result by providing a knowledge database 136 that stores answers and the associated questions. Preferably, the knowledge database 136 is populated by earlier questions and answers routed through the apparatus 10, as well as any number of preprogrammed questions and answers (e.g., an existing help line database). Once the category of a received information request message 18 has been determined, the database manager 140 is activated to search the knowledge database 136 for a responsive answer.

Figure 19:
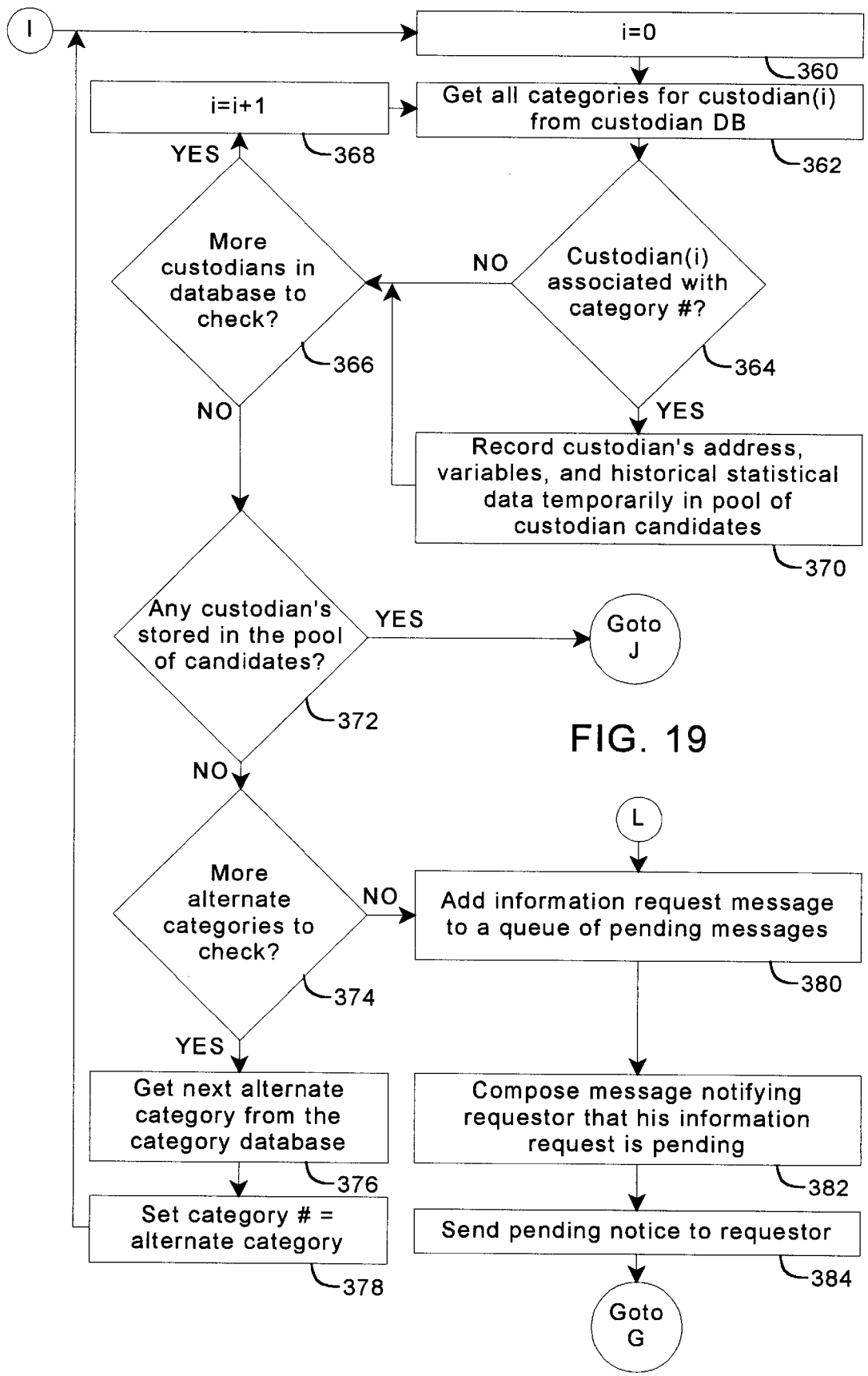

Specifically, after the loop counter has been reset at block 330 (FIG. 18), control proceeds to block 332. The database manager 140 then retrieves the category associated with the first file from the knowledge database 136 (block 332). At block 334, the database manager 140 then compares the category retrieved from the file to the requested category previously determined at block 310 or block 322. If the file's category does not match the requested category, the database manager 140 determines if there are more files to consider in the knowledge database 136 (block 336). If there are more files, the loop counter is incremented (block 338), the category of the next file is retrieved (block 332) and another comparison is made (block 334). The database manager 140 continues to loop through blocks 332–338 until all of the categories of all of the files in the knowledge database 136 are compared to the category associated with the information request message 18 or until a match is found at block 334. If no category match is found anywhere in the knowledge database 136, control proceeds to block 360 (FIG. 19).

If a match is found at block 334, the database manager 140 determines if this file pertains to the same question as the received information request message 18. In particular, the database manager 140 sets a second loop counter to zero (block 340). The database manager 140 then retrieves the first question synonym (e.g., the original question asked by the information requestor 12) associated with this file from the knowledge database 136 (block 342). The database manager 140 then compares the question synonym retrieved from the file to the value from the question segment 28 of the information request message 18 (block 344). If the question synonym does not match the value from the question segment 28, the database manager 140 determines if there are more synonyms associated with this file to consider (block 346). If there are more synonyms, the second loop counter is incremented (block 348), the next question synonym is retrieved (block 342) and another comparison is made (block 344). The database manager 140 continues to loop through blocks 342–348 until all of the question synonyms associated with this file are compared to the value from the question segment 28 of the information request message 18 or until a match is found at block 344.

If no question synonym match is found for this file, the database manager 140 increments the first loop counter (block 338) and retrieves the category associated with the next file in the knowledge database 136 (block 332). The database manager 140 continues the nested loop of blocks 332–348 until all of the question synonyms of all of the files in the knowledge database 136 with a matching category are compared to the value from the question segment 28 of the information request message 18 or until a question synonym match is found at block 344. If no synonym match is found, control proceeds to block 360 (FIG. 19).

If a question synonym is found at block 344, the database manager 140 passes the answer associated with that file to the message composer 122, and the message composer 122 preferably attaches the "canned" answer from the knowledge database 136 to the information request message 18 (block 350). Next, the message composer 122 and/or the database manager 140 determines if the file containing the "canned" answer is stale (block 352). As described in detail above, stale answers are answers which have not been authored, reviewed, and/or modified in longer than some predetermined period of time. If the file containing the answer is not stale, the message composer 122 preferably creates a final answer message 24 (see FIG. 8) by re-addressing the information request message 18 to be from the apparatus 10 and to the information requestor 12 (block 354). Optionally, advertisement(s) may be inserted in the final answer message 24 (block 356). Preferably, any advertisements inserted are selected based on the value of the subject field of the information request message 18. Optionally, the message may be translated to a different language based on the information requestor's preferences. Subsequently, the final answer message 24 is routed to the information requester 12 via a router 114 in a known manner (block 358), and control preferably returns to block 202 to receive additional messages.

Information Custodian Selection

Once a category is identified (e.g., a known category or the default "unidentified" category), the selector 110 preferably selects an appropriate information custodian(s) 14 from the custodian database 38 (see FIG. 14). Preferably, only information custodians 14 associated with the identified category are considered. Specifically, each information custodian 14 is associated with one or more categories. In the preferred embodiment, information custodians 14 associate themselves with certain categories by sending an e-mail message or by submitting a web page form to the apparatus 10. In another embodiment, an operator of the apparatus 10 enters the information. Preferably, information custodians 14 are associated with categories by storing a category cross reference number in the custodian database 38. However, persons of ordinary skill in the art will readily appreciate that other methods of associating information custodians 14 with categories may be employed. For example, one or more text strings identifying one or more categories could be stored in the custodian database 38.

As explained above, although one or more information custodians 14 may be selected at random, in the preferred embodiment custodian(s) 14 are selected by considering additional criteria. Specifically, the custodian database 38 preferably contains other fields of data, associated with each information custodian 14, to facilitate selection of an appropriate information custodian(s) 14. In the preferred embodiment, one or more variables may be defined and associated with an information custodian 14. These variables preferably define preferences of the information custodian 14.

For example, certain information custodians 14 may prefer to participate below some threshold frequency (e.g., no more than once per month). Accordingly, a value for a threshold variable may be stored in the custodian database 38 and considered by the selector 110 when selecting an appropriate information custodian 14. For example, an information custodian 14 who wants to limit his participation to one answer request message 20 per month may set a question frequency variable equal to one per month (e.g., questionFreq=1/month). Persons of ordinary skill in the art will readily appreciate that many ways of defining such a variable are possible. For example, "2<=questionFreq<=5" may represent the desire of an information custodian 14 to receive between two and five answer request messages 20 per month. Similarly, "questionFreq<=1.5/20 days" may represent the desire of an information custodian 14 to receive, on average, no more than one and one-half answer request messages 20 every twenty days. Other information custodians 14 may require a minimum number of answer request messages 20 (e.g., questionFreq>=100/day) which the apparatus 10 will attempt to meet.

Similarly, a certain information custodian 14 (or predefined group of information custodians 14 such as a department at a particular company) may be entitled to a certain percentage of the overall number of answer request messages 20 associated with a particular category or categories. For example, a computer hardware manufacturer may pay the owner of the apparatus 10 a fee in exchange for 50% of all computer hardware related answer request messages 18. Accordingly, the apparatus 10 would be instructed to select predefined information custodian(s) 14 associated with that manufacturer for 50% of the computer hardware related answer request messages 20 (e.g., every other message). In the preferred embodiment, such instruction would take the form of a variable (e.g., questionPercent=50) in combination with a category number or numbers (e.g., 1000007733).

Other variables may define other preferences associated with the information custodian 14. Some of these variables may take the form of logical expressions. Preferably, the selector 110 evaluates these expressions, to select an appropriate information custodian 14, in some instances by using values in the information requestor's 12 profile and targeting segments. For example, an information custodian 14 may wish to limit the answer request messages 20 he receives to those where a "novice" level reply is expected. In such a case, a variable definition might take the form of "userLevel=Novice" and/or "questionLevel=Novice". Accordingly, the selector 110 would only select that information custodian 14 for messages with segments identifying the expected response as "novice" (e.g., userLevel=Novice and/or questionLevel=Novice).

Complex Boolean expressions may also be used. For example, the computer hardware manufacturer in the above example may wish to further limit the type of answer request messages 20 received to ones originating from information requesters 12 over the age of twenty who own a computer that is over three years old (e.g., userAge>20 and pcAge>3 yrs). Further, functions may be invoked. For example, the computer hardware manufacturer may want 50% of all computer hardware related answer request messages 18, but he may be willing to pay a premium for answer request messages 18 originating from information requesters 12 matching a particular demographic profile (e.g., prefer (userAge>20 and pcAge>3 yrs)).

The variables may be set by the associated information custodian 14 (or someone else) by sending a message to the apparatus 10. For example an e-mail message containing a variable name and a variable value could be used (e.g., questionFreq=1/month). In a preferred embodiment, the information custodian 14 enters data into labeled fields on a form and then sends the data from the form to the apparatus 10 for storage in the custodian database 38. The form may be downloaded from the apparatus 10 or other server as part of a web page, a Java script, ActiveX control, etc as is conventional.

In order to evaluate certain variable expressions, specific historical statistical data may be required. For example, the selector 110 may need to determine if a particular information custodian 14, who is to receive only one answer request message 20 per month, has received an answer request message 20 yet that month. Accordingly, the history recorder 112 associates and records the date that each answer request message 20 is sent (e.g., questionsent=Jan. 1, 1998, Feb. 15, 1998, Mar. 20, 1998). Subsequently, the selector 110 may reference the historical statistical data when selecting an appropriate information custodian 14.

Other historical statistical data may be supplied by an information custodian 14 and/or a historical statistical data server (e.g., Dun and Bradstreet) in order to facilitate information custodian 14 selection. In the preferred embodiment, an information request message 18 may indicate that a response is required from one or more information custodians 14 meeting certain criteria. For example, the information request message 18 may be a request for quotation on a custom widget defined in an attached specification. In order to limit the number of responses, the information requestor 12 may be seeking bids only from widget makers employing more than five-hundred employees. Accordingly, the information requestor 12 may include a segment like "numberOfEmployees>500". The selector 110 would then evaluate potential information custodians 14 against this requirement by referencing historical statistical data.

Occasionally, the selector 110 may be unable to select an appropriate information custodian 14 for a particular information request message 18 (i.e., no information custodians 14 exist in the identified category, or no information custodians 14 are available based on the associated segments, variables, and/or historical statistical data). In such an instance, the selector 110 may select an alternate category from a predefined hierarchy of categories (see FIGS. 12 and 13). The alternate category may be narrower or more general than the original category. For example, if an information request message 18 contains a subject segment 27 value of "Animals/Bats", but no information custodians 14 are available in the "Animals/Bats" category, an information custodian 14 associated with the "Animals" category or the "Animals/Bats/Radar" category or the "Zoology" category may be selected (e.g. 1000001234; 1000005678; 1000002468; . . . ).

Returning to the detailed flowchart, if the file containing the answer is stale or no question synonym is found (blocks 352 and 336 of FIG. 18 respectively), the selector 110 attempts to identify one or more information custodians 14 who may supply a response. Specifically, after the loop counter has been reset at block 360 (FIG. 19), control proceeds to block 362. The selector 110 then retrieves the category(s) associated with the first information custodian 14 from the custodian database 38 (block 362). At block 364, the selector 110 then compares each category retrieved for the current information custodian 14 to the current category. The current category is the requested category previously determined at block 310 or block 322, or, the current category is an alternate category determined at block 376 and discussed in more detail below. If none of the custodian's categories match the current category, the selector 110 determines if there are more custodians 14 to consider in the custodian database 38 (block 366). If there are more custodians 14, the loop counter is incremented (block 368), the category(s) of the next custodian 14 are retrieved (block 362) and another comparison is made (block 364). The selector 110 continues to loop through blocks 362–368 until all of the categories of all of the custodians 14 in the custodian database 136 are compared to the current category. Each time a match is found at block 364, the selector 110 records that custodian's address, variables (if any), and historical statistical data (if any) temporarily in a pool of custodian candidates (block 370).

Once all of the categories of all of the custodians 14 have been compared to the current category, the selector 110 determines if any custodian candidates have been identified (i.e., is there any information in the temporary pool of custodian candidates?) (block 372). If no custodian candidates have been identified, the selector 110 determines if there are any alternate categories that have not yet been evaluated for this information request message 18 (block 374). If there are more alternate categories to be evaluated, the selector 110 gets the next alternate category from the category database 36 (block 376). The selector 110 then sets the current category number to the alternate category number (block 378). Subsequently, the selector 110, armed with an alternate category, repeats the attempt to identify one or more information custodians 14 who may supply a response starting at block 360.

If the selector 110 determines that there are no alternate categories remaining to be evaluated for this information request message 18 (block 374), the queue manager 132 adds the information request 18 to the queue of pending messages 134 (block 380). Subsequently, the message composer 122 creates a message to notify the information requestor 12 that his request 18 is pending the availability of custodian 14 (block 382), and the router 114 sends the message to the information requester 12 (block 384).

Figure 20:
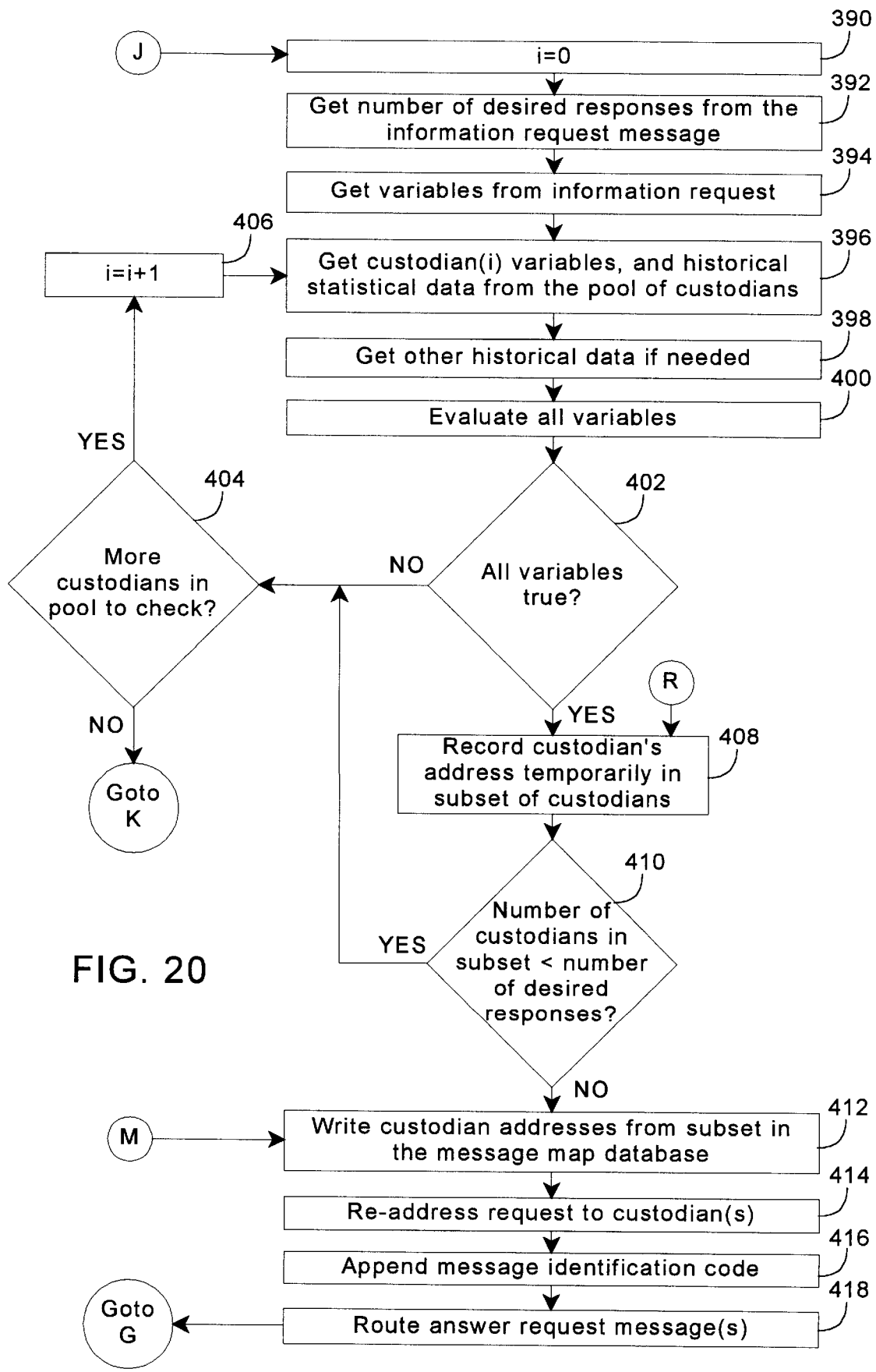
Figure 21:
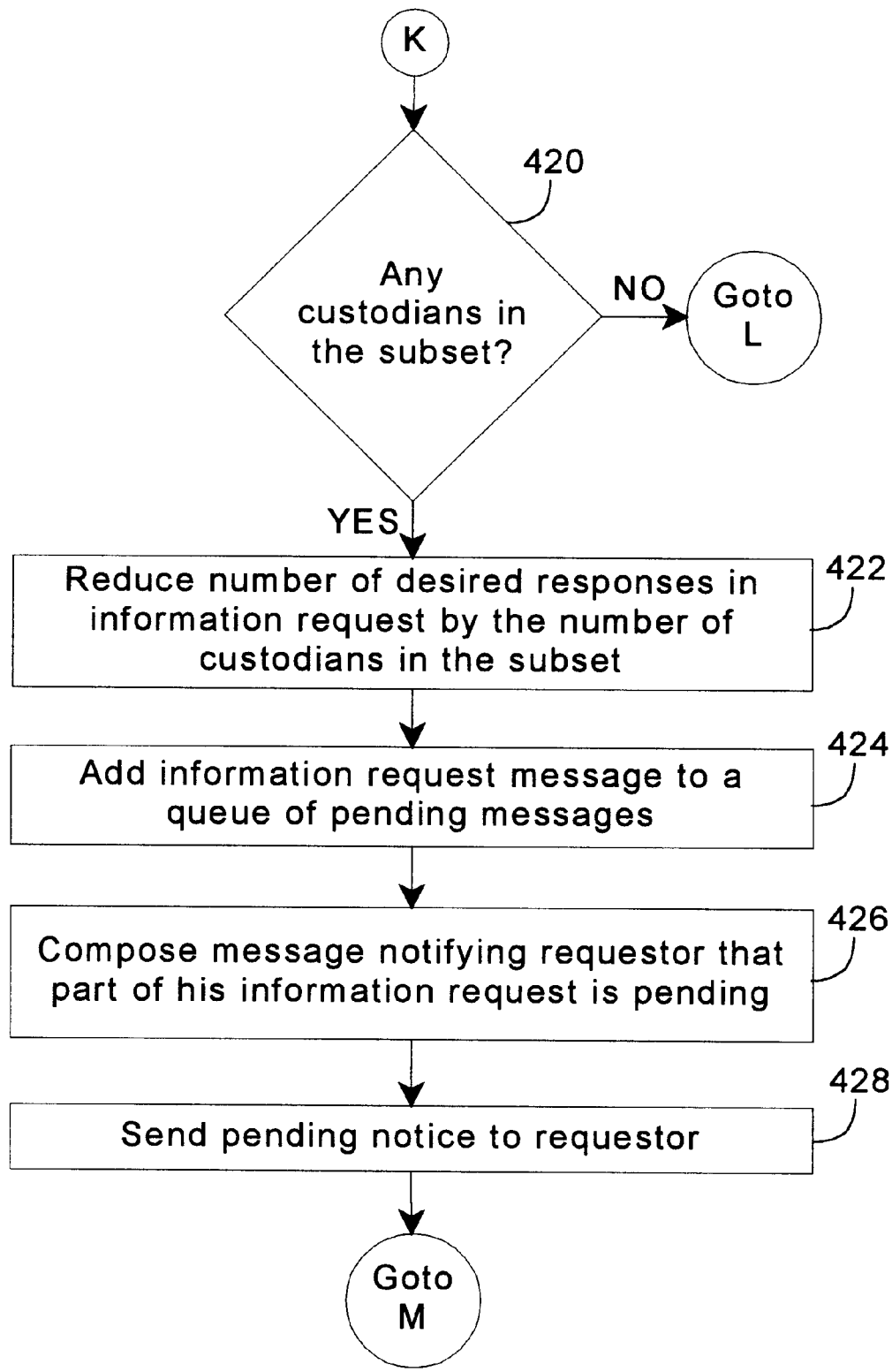

If one or more potential information custodians 14 are stored in the pool of candidates as determined by block 372, the selector 110 determines which of the custodians 14, if any, qualify based on the evaluation of any associated variables and/or historical statistical data. Specifically, after the loop counter has been reset at block 390, control proceeds to block 392 (FIG. 20). The selector 110 then retrieves the number of desired responses from the information request message 18 (block 392). As discussed in detail above, the information request message 18 preferably includes a segment indicating the number of desired responses (e.g., maxCustodians=10). If no such segment is identified, the selector 110 preferably assumes only one response is desired.

The selector 110 also retrieves any variables included with the information request message (block 394). Optionally, the selector 110 may also retrieve locally stored variables associated with this particular information requestor 18. The selector 110 then retrieves the variables and historical statistical data associated with the first potential information custodian 14 from the pool of information custodians 14 (block 396). Of course, the selector 110 could also retrieve this information from the custodian database 38 to avoid the storage of redundant information. Further, the selector 110 may retrieve other historical statistical data if needed (e.g., query the Dun & Bradstreet database) (block 398). Once all of the necessary data is acquired, the selector 110 evaluates the variables to determine if this custodian 14 is eligible to respond to this information request 18 (block 400).

If any one of the variables evaluates to "false" (block 402), then the selector 110 determines if there are more custodians 14 in the pool of potential information custodians to consider (block 404). If there are more custodians 14 to consider, the loop counter is incremented (block 406), the variables and historical statistical data of the next custodian 14 in the pool is retrieved (block 396), other historical statistical data is retrieved if needed (block 398), and another variable evaluation is made (block 400). The selector 110 continues to loop through blocks 396–406 until all of the custodians 14 in the pool have been evaluated or until enough eligible custodians 14 are found to satisfy the number of desired responses.

If all of the variables evaluate to "true" (block 402), then the selector 110 records the current custodian's address temporarily in a subset of custodians (block 408). Subsequently, the selector 110 determines if the number of custodians in the subset is less than the number of desired responses previously determined (i.e., do we have enough eligible information custodians 14?) (block 410). If the number of custodians in the subset is less then the number of desired responses, then the selector 110 determines if there are more custodians 14 in the pool of potential information custodians to consider (block 404). If there are more custodians 14 to consider, the selector 110 continues to loop through blocks 396–406 as discussed in detail above. If the selector 110 runs out of custodians in the pool before a sufficient number are found, control proceeds to block 420 of FIG. 21.

At block 420, the selector 110 determines if there are any custodians 14 in the subset (i.e., did the process ever reach block 408, FIG. 20, for this information request message 18). If not, control proceeds to block 380 of FIG. 19. Specifically, the queue manager 132 adds the information request 18 to the queue of pending messages 134 (block 380), the message composer 122 creates a message to notify the information requestor 12 that his request 18 is pending (block 382), and the router 114 sends the message to the information requestor 12 (block 384).

If the selector 110 determines that there is at least one custodian 14 in the subset of custodians at block 420 (i.e., there is at least one eligible information custodians 14), then the number of desired responses associated with the current information request 18 is reduced by the number of e custodian 14 in the subset (block 422). Further, the queue manager 132 adds the information request 18 to the queue of pending messages 134 (block 424). Subsequently, the message composer 122 creates a message to notify the information requestor 12 that part of his request 18 is pending (block 426), and the router 114 sends the message to the information requestor 12 (block 428). Control then passes to the selector at block 412 of FIG. 20.

If a partial pending notice is sent (block 428, FIG. 21), or, it is determined that there are enough eligible custodians 14 (block 410, FIG. 20), then the selector 110 preferably instructs the message mapper 126 to write all of the custodian addresses from the temporary subset in the message map database 118 (block 412). For example, if the number of desired responses is one (the preferred default), then, given that the selector 110 just located an eligible information custodian 14, the number of custodians in the subset will not be less than the number of desired responses (i.e., one is not less than one). Accordingly, the selector 110 would convey the address of that custodian 14 to the message mapper 126, and the message mapper 126 would write the address in the message map database 118. Alternatively, the selector 110 could write directly to the message map database 118.

Answer Request Message Creation

Once the address(es) of the selected information custodian(s) 14 are recorded in the message map database 118 at block 412, the message composer 122 creates an answer request message 20. The answer request message 20 preferably consists of essentially the same segments as the information request message 18 from which it is based (see FIG. 5). However, the answer request message 20 is addressed to the selected information custodian 14 (e.g., To: Dr_McWilliams@zoo.edu), it is addressed from the apparatus 10 (e.g., info@apparatus.com), and preferably a segment 29 containing the message identification code is appended (e.g., ID: 123456). The information requestor 12 may or may not remain anonymous.

Specifically, the message composer 122 preferably readdresses the information request message 18 to the selected information custodian(s) 14 (block 414) and appends the message identification code recorded in the message map database 118 (block 416). Optionally, the message may be translated to a different language based on the information custodians' preferences. Subsequently, the router 114 sends the modified information request message (i.e., the answer request message 20) to the selected information custodian(s) 14 (block 418). In other words, the message composer 122 and the router 114 cooperate to label and forward the information request 18 to the appropriate information custodians 14, and then control preferably returns to block 202 to receive additional messages.

Reroute Message Creation

Once an information custodian 14 receives an answer request message 20, he preferably examines it to determine if he is an appropriate information custodian 14 (e.g., if the subject segment 27 was filled out correctly). If the information custodian 14 determines that he is not the appropriate person to respond, he preferably sends a reroute message 23 to the apparatus 10 in the form of an e-mail message. In the preferred embodiment, an information custodian 14 creates a reroute message 23 by modifying the subject segment 27 of the answer request message 20 (See FIG. 6). For example, if the information custodian 14 is qualified to answer general questions about bats, but prefers to let other experts handle questions about bat radar, he may amend the value of the subject segment 27 to include the word radar (e.g., from "Animals/Bats" to "Animals/Bats/Radar"). In another example, the information custodian 14 may determine that the question is actually related to "Sports/Baseball/Bats". As a result the information custodian 14 may completely change the subject segment 27. Still further, the information custodian 14 may determine that the subject segment 27 value does match the question, but that he prefers not to answer it. In such an instance, a predetermined character(s) may be appended to the subject (e.g., "/reroute").

Answer request messages 20 may be rerouted any number of times (although maximums may optionally be enforced). Typically, information custodians 14 are better equipped to categorize messages, therefore, the answer request message 20 will typically eventually find an appropriate information custodian 14 who will prepare an intermediate answer message 22.

Reroute Message Identification

Once received, the reroute message 18 is preferably examined by the message type identifier 130 (block 206). As mentioned above, the message type. identifier 130 preferably determines if the received message is an information request message 18 (block 204), a reroute message 23 (block 206), an intermediate answer message 22 (block 208), a status change message (block 210), a category change message (block 212), a request to search the knowledge database 136 (block 214), or some other message type. Preferably, the message type identifier 130 determines that a message is a reroute message 23 by checking for a value in the message identification segment 29 (i.e., a message identification code) (e.g., 123456) that matches a value recorded in the message map database 118 (block 204). If the received message has a message identification code that is recorded in the message map database 118, then the message type identifier 130 preferably compares the value of the subject segment 27 of the received message with the value of the subject segment 27 recorded in the message map database 32 that is associated with that message identification code (block 206). If the two subjects are different, then the message type identifier 130 determines that the message is a reroute message 23, and control proceeds to block 429 of FIG. 17.

Specifically, after recording the new subject in the message map database 118 (block 429), the apparatus 10 essentially repeats the process of identifying a category, attempting to locate an answer in the knowledge database 136, and, if necessary, routing the request to selected information custodian(s) 14 as discussed in detail above (blocks 308–428). The main difference being, that the selector 110 reads the modified subject segment 27 before performing the process.

New categories, category aliases, and alternate categories may be added to the category database 36 in many different ways. In one embodiment, when a default category is selected (e.g., the message type identifier 130 is not able to fully resolve the received subject 27), and that message is subsequently rerouted, the value of the subject segment 27 prior to modification by the information custodian 14 may be added as an alias to the category identified by the information custodian 14.

Intermediate Answer Message Creation

Assuming that, instead of requesting rerouting, the information custodian 14 determines that he is an appropriate person to respond to the answer request message 20, he preferably develops and sends an intermediate answer message 22 to the apparatus 10 (see FIG. 7). An intermediate answer message 22 preferably contains one or more answer segments 30, 31. An answer segment 30, 31 provides the information that the information requester 12 is seeking. In the preferred embodiment, each information request message 18 contains at least two answer segments 30, 31, a short answer segment 30 and a long answer segment 31. Preferably, the short answer is a short text message (e.g., Bats use sonar to "see" in the dark.). The long answer may be several lines of text, optionally accompanied by graphics, video, audio, hyperlinks and other media formats. The short answer facilitates message categorization (for subsequent retrieval from the knowledge database 136), while the long answer addresses the question in more detail.

The information custodian 14 may amend the question segment 28 and/or he may include a question synonym segment (not shown) to facilitate subsequent automatic and/or manual retrievals. For example, if the original question was "How do batts see in the dark?", the information custodian 14 may correct the misspelling of "batts" to "bats" to facilitate subsequent searching of a knowledge database 136 as discussed in detail below. Further, the information custodian 14 may include one or more question synonyms (e.g., "Do bats have radar?").

Optionally, advertisements may be included in the intermediate answer message 22. For example, the computer hardware manufacturer in the above examples may wish to include an advertisement with a hyperlink to his web site. After composing the intermediate answer message 22, the information custodian 14 sends the intermediate answer message 22 to the apparatus 10 in a known manner (e.g., as an e-mail message).

Intermediate Answer Message Identification

Once received, the intermediate answer message 22 is preferably examined by the message type identifier 130 (block 208, FIG. 16). Preferably, the message type identifier 130 determines that a message is a intermediate answer message 22 by checking for a message identification code (e.g., ID number). If the received message has a message identification. code, then the message type identifier 130 preferably compares the value of the subject segment 27 of the received message with the value of the subject segment 27 recorded in the message map database 32 that is associated with that message identification code. If the two subjects are the same, then the message type identifier 130 may determine that the message is an intermediate answer message 22.

Recording Questions and Answers in the Knowledge Database

When the message type identifier 130 identifies an intermediate answer message 22, it passes the message 22 to the database manager 140 (block 208). The database manager 140 responds to the receipt of an intermediate answer message 22 by recording at least a portion of the message 22 in the knowledge database 136 for later retrieval and use (See FIG. 22, block 430). In particular, the database manager 140 preferably records the category number associated with the intermediate answer message 22, the unique message identification code, a timestamp, a short version of the question, a short version of the answer (if present), and a pointer to the complete versions of the messages (including the long answer if present) (see FIG. 15). Any of these fields may be used subsequently as search indices. Optionally, the address of the information requestor 12 and/or information custodian 14 are recorded, but may be publicly inaccessible. The message mapper 126 responds by updating the message map database 118 to reflect the "answered date" for the information request (i.e., the date on which the intermediate answer message 22 was received by the apparatus 10). (See FIG. 11).

As explained above, several different entities may reference the knowledge database 136. Information requestors 12 may check the knowledge database 136 before sending an information request message 18 in order to more quickly answer a question. Similarly, information custodians 14 may check the knowledge database 136 before sending an intermediate answer message 22 in order to more efficiently answer a question. For example, the information custodian 14 may simply re-send an existing answer located in the knowledge database 136. In such an instance, the information requestor's 12 question may be automatically or manually added to the knowledge database 136 as a question synonym to facilitate subsequent automatic and/or manual retrievals. Alternatively, the information custodian 14 may use part of the intermediate answer message 22 stored in the knowledge database 136 to create a new intermediate answer message 22.

If the information custodian 14 determines that a new intermediate answer message 22 should replace an existing intermediate answer message 22 in the knowledge database 136, he may have the authority to do so. For example, a tax specialist may determine that a previous answer is no longer applicable because the law has changed. In an alternate embodiment, several information custodians 14 (preferably from the category associated with the intermediate answer message 22) would be required to electronically vote in order to replace an existing intermediate answer message 22 in the knowledge database 136. In yet another embodiment, the database manager 44 periodically scans intermediate answer messages 22 stored in the knowledge database 136. If the database manager 140 finds a stale intermediate answer messages 22, (i.e., an intermediate answer message 22 that has not been reviewed by an information custodian 14 in the subject category for longer than a predetermined time period that may be unique to each message or category) (e.g., information custodian 14 sets the value of a "Refresh" segment for a tax answer to one year), then a message to refresh the answer may be automatically sent to an appropriate information custodian 14. Subsequently, the new answer may be stored in the knowledge database 136 and/or forwarded to any information requestors 12 that previously viewed the old version of the answer. However, information requestors 12 may chose not to receive updates.

Further, the apparatus 10 preferably automatically checks the knowledge database 136 when a message is received. For example, upon receipt of an information request message 18 from an information requestor 12, the database manager 140 preferably searchs the knowledge database 136 for an intermediate answer message 22 associated with a previous information request message 18 similar to the current information request message 18. If the database manger 140 identifies a similar information request message 18, the message composer 122 may then use portions of the associated intermediate answer message 22 as part of the final answer message 24. The router 114 may then route the final answer message 24 to the information requester 12, without routing an answer request message 20 to an information custodian 14. Of course the information requester 12 may have the option of disabling the automatic knowledge database check.

Alternatively, portions of an intermediate answer message 22 created with data from the knowledge database 136 may be routed to one or more selected information custodians 14 along with a current answer request message 20. In this embodiment, the information custodian 14 may be able to create an intermediate answer message 22 more efficiently by using some or all of the automatically selected information from the knowledge database 136. As discussed in detail above, the question of the information requester 12 may be automatically or manually added to the knowledge database 136 as a question synonym; the information custodian 14 may determine that the new intermediate answer message 22 should replace the existing intermediate answer message 22 in the knowledge database 136; and/or several information custodians may be required to electronically vote in order to replace an existing intermediate answer message 22.

Intermediate Answer Message Selection

In some instances (e.g., the question—answer paradigm), the answer request message 20 is sent to only one information custodian 14. However, in other instances (e.g., bid solicitations), the information request message 18 is sent to multiple information custodians 14. Therefore when an intermediate answer message 22 is received, it is necessary to poll the message map database 118 to determine whether one or more responses (intermediate answer messages 22) are expected. If only one intermediate answer message 22 is expected, the apparatus 10 will immediately respond to the receipt of an intermediate answer message 22 by converting that message 22 into a final answer message 24. If, however, more than one intermediate answer. message 22 is expected, the message mapper 126 may optionally proceed to test certain criteria before permitting the message composer 122 to prepare one or more final answer messages 24.

Figure 22:
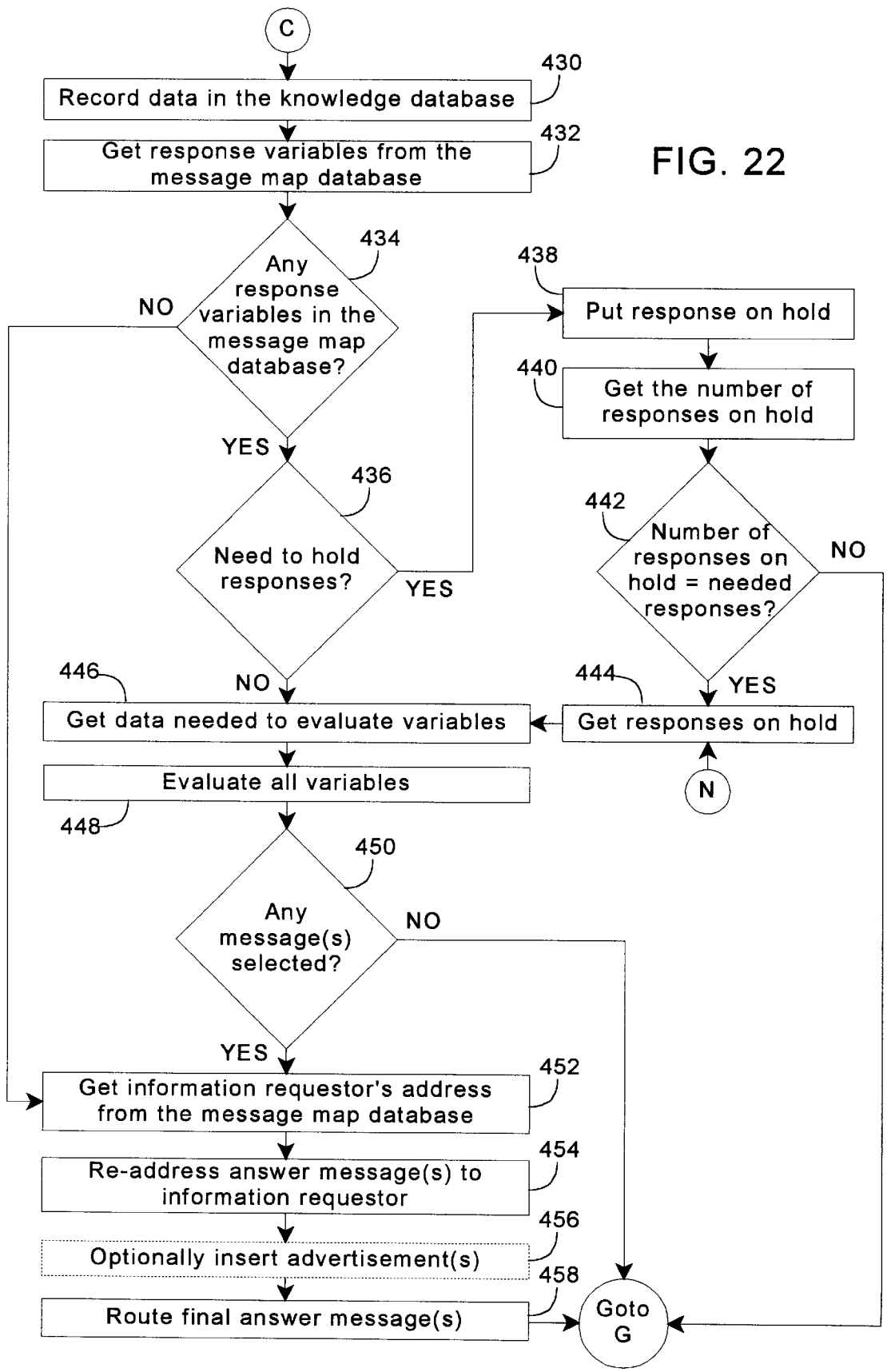
Figure 23:
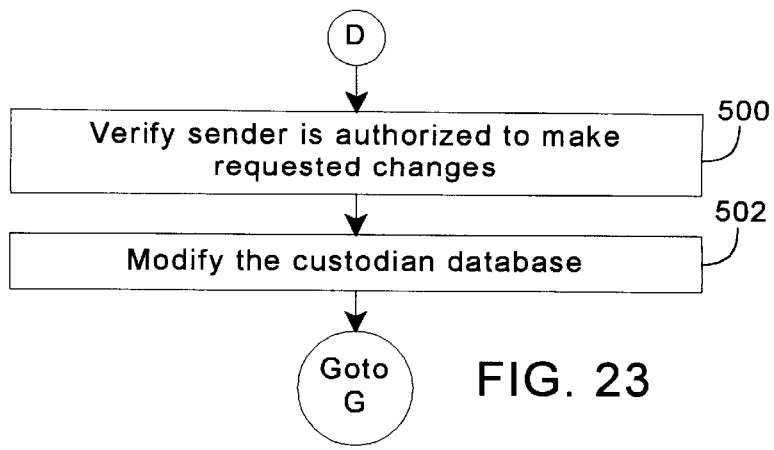
Figure 24:
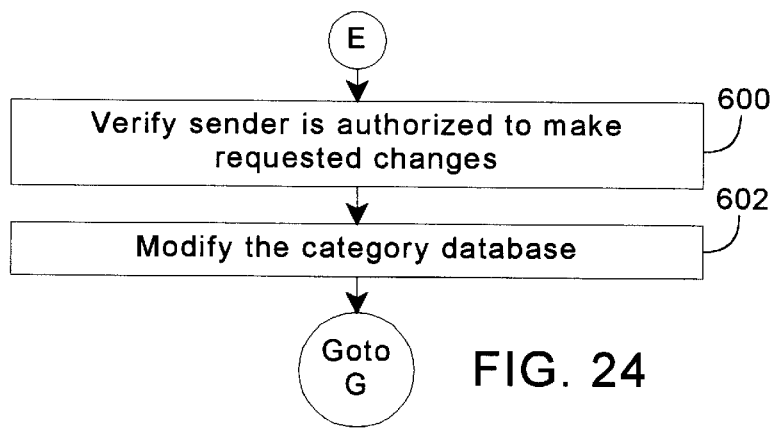
Figure 25:
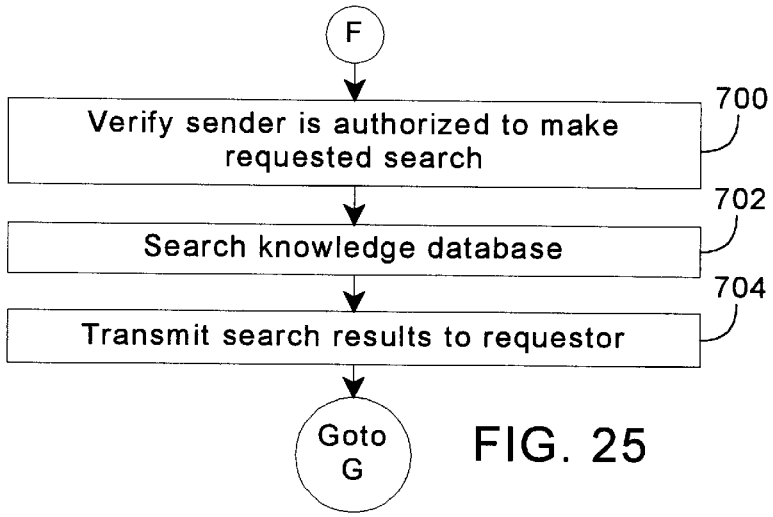
Figure 26:
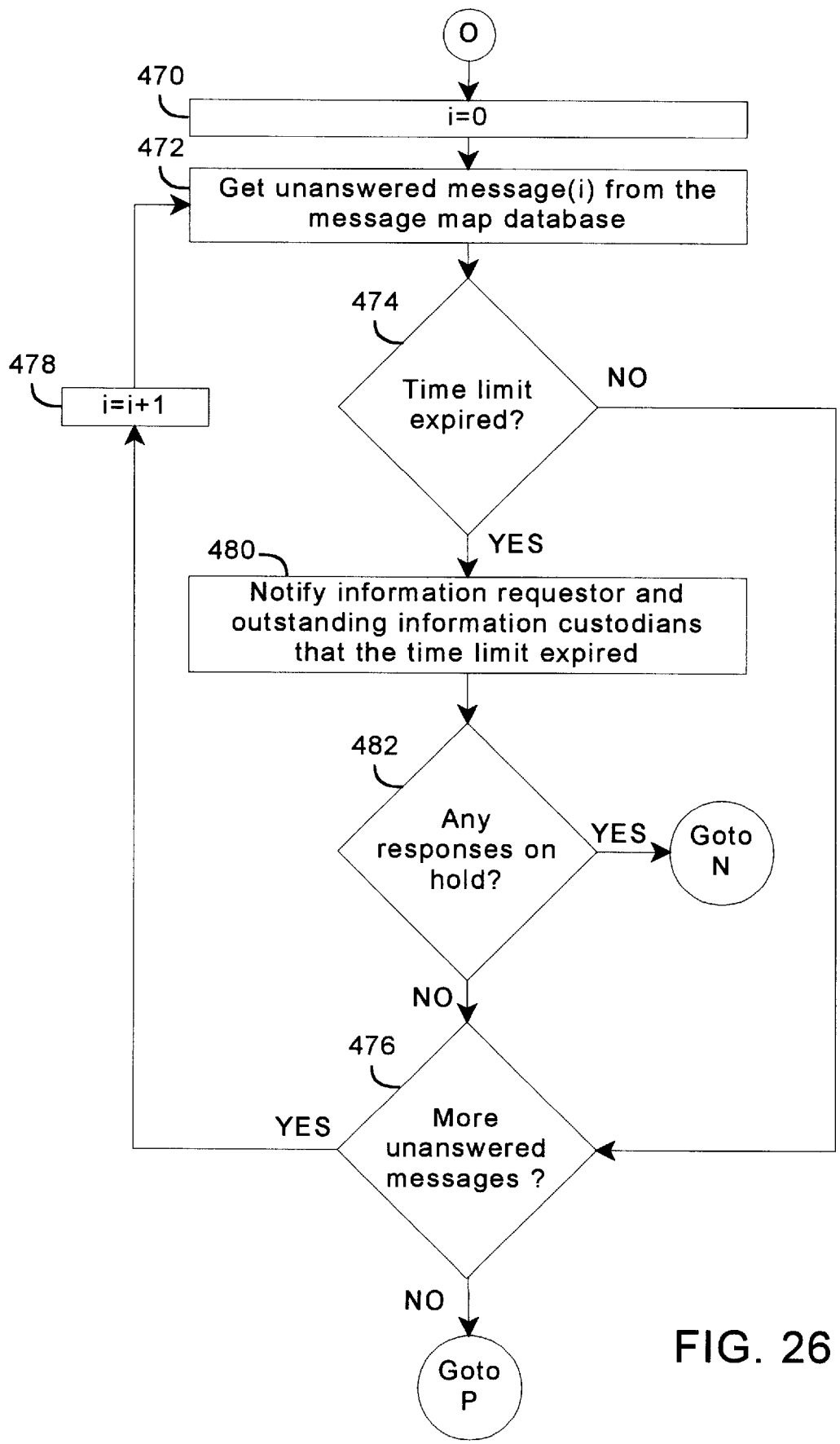
Figure 27:
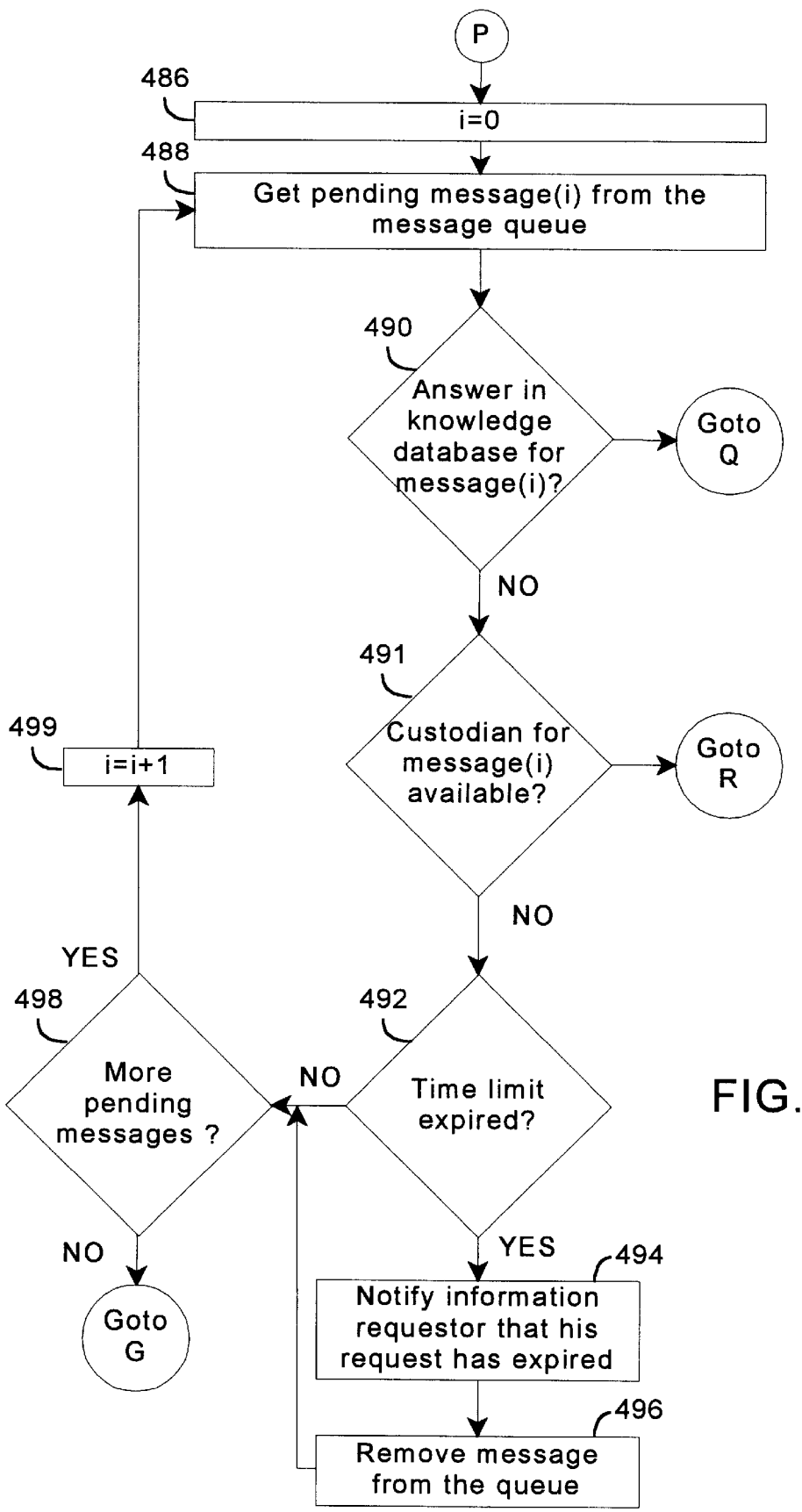

More specifically, as shown in FIG. 22, the message mapper 126 retrieves any response variables present in the message map database 118 for the associated information request (block 432). If no response variables are recorded in the message map database 118, control proceeds to block 452. Otherwise, control proceeds to block 436.

In one request—multiple answer circumstances, the information requestor 12 may optionally include certain segments in the information request message 18 that place limits on the acceptable responses. The information custodians 14 may or may not be aware of these limitations. For example, the information requester 12 may include a segment like "price<$10", which is optionally omitted form the corresponding answer request messages 20. In such an instance, the apparatus 10 may filter out intermediate answer messages 22 that do not meet the specified criteria by checking the values of the appropriate segments. Similarly, the number of responses may be limited (e.g., maxResponses=First 10; or maxResponses=lowestPriced5).

If response variables are present, at block 436, the message mapper 126 examines the retrieved response variables to determine whether multiple responses are requested. If not, control proceeds to block 446. Otherwise, the message mapper 126 flags the intermediate answer messages 22 as being on hold (block 438). The message mapper 126 then determines the number of intermediate answer messages 22 that are on hold for the subject information request (block 440). If the number of responses presently on hold (including the current intermediate answer message 22) is less than the number of responses requested by the information requestor 12 (block 442), control returns to block 202 in FIG. 16. If the number of responses on hold equals the number of responses requested by the information requester 12 (block 442), control proceeds to block 444.

At block 444, the message mapper 126 retrieves all of the responses that are currently on hold for the subject request. Any data needed to evaluate the intermediate answer message(s) 22 is then retrieved (block 446). Such retrieval can, of course, be through local database(s) (e.g., the custodian database 38), or through external databases (e.g., a credit check to an on-line credit verification database, or a request for financial information from an on-line database such as Dun & Bradstreet, etc). In any event, once all of the needed data is collected, the data for each intermediate answer message 22 is evaluated against the response variables to create a set of intermediate answer messages 22 that meet the criteria of the requestor 12 (block 448). If that set is a null set (block 450), control proceeds to block 202 of FIG. 16. If not, control proceeds to block 452.

Before proceeding with the discussion of blocks 452–458, it should be noted that some requesters 12 of multiple responses may wish to opt out of the "hold for all responses" sub-routine represented by blocks 438–442. (The opt-out selection will, of course, be reflected in the response variables.) If opt out occurs, control will proceed immediately from block 436 to block 446. Similarly, control will also proceed immediately from block 436 to block 446 for information request messages 18 that do not request multiple responses. In either event, intermediate answer messages 22 responding to the information request of that particular requestor 12 will be evaluated for compliance with the requestor's criteria (blocks 446–448) immediately upon receipt. If the processed message 22 does not meet the criteria (block 450) control will return to block 202 of FIG. 16. Otherwise control proceeds to block 452.

Final Answer Message Creation

The final answer message 24 preferably comprises most of the same segments as the intermediate answer message 22 upon which it is based (see FIG. 8). However, the final answer message 24 is addressed to the information requestor 12 (e.g., To: John_Doe@isp.com), and it is addressed from the apparatus 10 (e.g., info@apparatus.com). The information custodian 14 may or may not remain anonymous (e.g., the information custodian's name and/or Internet address may optionally be included in the text of the final answer message 24).

Referring to FIG. 22, regardless of whether control arrives at block 452 via block 450 or block 434, the message composer 122 retrieves the address of the information requester 12 from the message map database 118 (block 452). The address of the information requester 12 is preferably determined by cross referencing the message identification code associated with the intermediate answer message 22 to the message identification code recorded in the message map database 118. The message composer 122 then composes final answer message(s) 24 from the intermediate answer message(s) by eliminating the address of the information custodian 14 from the intermediate answer message (s) 22 and re-addressing the intermediate answer message(s) to the information requester 12 (block 454).

Optionally, the message composer 122 may insert an advertisement into the final answer message 24 (block 456). As discussed above, the advertisement may also be included in the intermediate answer message 22 by the information custodian 14. However, under the message composer approach, the information custodian 14 and/or the originator of the ad is not burdened by ad insertion, but will preferably pay a fee for this service. Further, in the event that an answer is automatically generated by the apparatus 10 using the knowledge database 136, an advertisement included in the associated intermediate answer message 22 may be left intact, removed, and/or replaced with a new advertisement by the message composer 122. Optionally, the message may be translated to a different language.

The message composer 122 and the router 114 then cooperate to route the final answer message 24 to the information requester 12 over the network 16 (block 458). Control then returns to block 202 of FIG. 16 where the apparatus 10 awaits receipt of the next message for processing.

Status Change Messages

An information custodian 14 (or someone else) may send a status change message to the apparatus 10. Status change messages may be used to modify the custodian database 38. Preferably, when a status change message is identified (block 210), the apparatus 10 verifies that the sending individual is authorized to make the requested changes (see FIG. 23, block 500). Verification may be performed using a variety of known methods. By way of examples, not limitations, the sending individual may send a user name and password, or the sending individual may digitally sign the status change message.

If authorization is present, the category manager 106 will modify the custodian database 38 per the instructions included in the status change message (block 502). The apparatus 10 will then process future information request messages 18 potentially relating to the custodian 14 in accordance with the custodian's wishes. By way of examples, not limitations, the status change message may seek to change the network address of the sending custodian 14, may seek to delete the sending custodian 14 from one or more categories, may seek to add the individual originating the message as a new information custodian 14 in one or more categories, may seek to change one or more variables that effect the type or number of information request messages 18 routed to the sending information custodian 14, and/or may seek to add the sending individual as an information custodian 14 in one or more additional categories.

Category Change Messages

An information custodian 14 (or someone else) may send a category change message to the apparatus 10. Category change messages may be used to modify the category database 36. Preferably, when a category change message is identified (block 212, FIG. 16), the category manager 106 verifies that the sending individual is authorized to make the requested changes (see FIG. 24, block 600). As discussed above, verification may be performed using a variety of known methods (e.g., user name and password, or a digital signature).

If authorization is present, the category manager 106 will modify the category database 36 per the instructions included in the category change message (block 602). The apparatus 10 will then processes future information request messages 18 potentially relating to the category in accordance with the modified category database 36. By way of examples, not limitations, the category change message may seek to add a new category, delete an existing category, combine two or more categories, add a new alias to a category, delete an existing alias, add an alternate category, and/or delete an alternate category.

In the preferred embodiment, several information custodians (preferably from the same or similar categories) may be required to electronically vote in order to add or delete a category, category alias, or alternate category in the category database 36. For example, an information custodian 14 or information requestor 12 may send an e-mail message or submit a web page form proposing "Animals/Bats/Radar" as a new category, new alias to an existing category, or alternate category to an existing category. The proposal could then be distributed to some or all of the information custodians 14 in a similar category for automatic voting. For example, the proposal (preferably in the form of an electronic voting form) could be routed to all information custodians 14 in "Animals/Bats". Or, a pseudo random sample of information custodians 14 from "Animals/Bats" and some or all of its alternate categories may be selected to vote.

Requests to Search the Knowledge Database

An information requester 12, an information custodian 14, or someone else may send a request to search the knowledge database 136 to the apparatus 10. Requests to search the knowledge database 136 are preferably handled by the database manager 140. Requests to search the knowledge database 136 may be used by an information requestor 12 to gain immediate access to the information he seeks. Requests to search the knowledge database 136 may also be used by an information custodian 14 to further his knowledge, to create a "canned" response to an answer request message 20, and/or to supplement his response to an answer request message 20. Preferably, when a request to search the knowledge database 136 is received, the database manager 140 verifies that the requesting individual is authorized to make the request (see FIG. 25, block 700). As discussed above, verification may be performed using a variety of known methods (e.g., user name and password, or a digital signature).

If authorization is present, the database manager 140 may then search the knowledge database 136 per the query included in the search request (block 702). By way of examples, not limitations, the search request may seek to find questions associated with a particular category, questions not associated with a particular category, questions associated with a particular identification code, questions not associated with a particular identification code, questions associated with a particular time period, questions not associated with a particular time period, questions containing certain key words, questions not containing certain key words, question synonyms containing certain key words, question synonyms not containing certain key words, questions from a certain information requestor 12, questions not from a certain information requester 12, answers associated with a particular category, answers not associated with a particular category, answers associated with a particular identification code, answers not associated with a particular identification code, answers associated with a particular time period, answers not associated with a particular time period, answers containing certain key words, answers not containing certain key words, short answers containing certain key words, short answers not containing certain key words, answers from a certain information custodian 14, and/or answers not from a certain information custodian 14. However, in the preferred embodiment, the identity of the information requesters 12 and the information custodians 14 remain anonymous.

Subsequently, the apparatus 10 may transmit some or all of the search results to the requestor (block 704). This transmission may include any advertisements that were included in the original answer, and/or this transmission may include a new advertisement. By way of examples, not limitations, the search results may be transmitted in the form of an e-mail message, a web page, application specific data, and/or other data.

Other Messages

In addition to the message types discussed in detail above, the apparatus may handle many.other types of messages (FIG. 16, block 216). Preferably, as discussed in detail above, the information requestor 12 and/or the information custodian 14 remain anonymous unless one or both of the parties discloses his own identity (e.g., information custodian 14 includes an advertisement). In addition, subsequent communication between the parties (e.g., follow up questions, answers, and/or advertisements) may be routed anonymously to the same person (i.e., no need to known the party's address and no new information custodian 14 selection) by associating the subsequent message with the previously assigned message identification code (i.e., "anonymous one-to-one threading"). For example, the message type identifier 130 may identify the subsequent message by looking for predefined character(s) in the subject segment 27 (e.g., "Re:"), or by looking at another segment (e.g., "Custodian: 123456"), or by comparing the value of one or more segments of the subsequent message with the value of the corresponding segments in previous messages associated with this message identification code. Once the message type identifier 130 determines that the message is a follow-up message, the message mapper 126 preferably looks up the appropriate recipient by message identification code in the message map database 118, and modifies the "To:" segment 25 and the "From:" segment 26 as described in detail above to create an answer request message 20. In the event that one of the parties wishes to "disconnect" the thread (i.e., no longer allow communications related to this message identification code), a message from that party to the apparatus 10 may optionally disable subsequent anonymous threading associated with that message identification code.

Optionally, an information requestor 12 could send an evaluation form to the apparatus 10, numerically characterizing the quality of a particular final answer message 24 they received. Information custodians 14 in poor standing (as determined by the compiled results of such forms) may be subject to review and disqualification. Further, specific requests for review could be submitted for flagrant misuse. For example, a company abusing the system by providing generic answers with excessive advertising may be removed from the custodian database 38. Information custodians 14 in good standing could be preferred as voting members. For example, when a new category is proposed or an information custodian 14 needs to be reviewed for inclusion, a random sample of information custodians 14 in that subject area above a certain average rating could be consulted in return for a certain number of "free" questions.

Canceling Requests Due to Tardy Custodians

After initializing the loop counter to zero (FIG. 26, block 470), the message mapper 126 preferably retrieves the first unanswered message from the message map database 118 (block 472). Unanswered messages are messages with a null value in the "Answered" timestamp field (see FIG. 11). Subsequently, the message mapper 126 determines if the current message has gone unanswered for longer than a predetermined period of time (block 474). Preferably, the message mapper 126 make this determination by subtracting the value of the "Asked" timestamp field from the current date and comparing the result to a predetermined time period (e.g., 10 days). The predetermined time period may be fixed for all messages or it may be defined by the information request message 18. If the time limit has not expired, the message mapper 126 determines if there are more unanswered messages to consider (block 476). If so, the message mapper 126 increments the loop counter (block 478), retrieves the next unanswered message from the message map database 118 (block 472), and determines if this message has gone unanswered for a predetermined period of time (block 474). The message mapper 126 continues to loop through blocks 472–478 until there are no more unanswered messages to consider. Each time an expired message is found, the message mapper 126 directs the message composer 122 (in cooperation with the router 114) to notify the information requester 12 and any outstanding information custodians 14 that the time limit has expired (block 480). Optionally, the message mapper 126 may delete or otherwise mark the corresponding record in the message map database 118. If there are any responses on hold (block 482), control proceeds to block 444 of FIG. 22 to process any existing responses. (e.g., the information request 18 asked for three responses, but only two were received). When there are no more unanswered messages to consider, control proceeds to block 486 of FIG. 27.

Canceling Requests Due to Lack of Eligible Custodians

After initializing the loop counter to zero (block 486, FIG. 27), the queue manager 134 preferably retrieves the first message from the queue of pending messages 132 (block 488). Subsequently, the apparatus 10 determines if there are any answers in the knowledge database 136 (as described in detail above) that answer the pending message (block 490). Preferably, only answers created or modified since the last time the database 136 was checked for an answer to this message are considered. If such an answer is present in the knowledge database 136, the queue manager 134 removes the message from the queue 132 and control proceeds to block 350 (FIG. 18). If the apparatus 10 determines that an answer is not available in the knowledge database 136, it determines if an eligible information custodian 14 is now available to respond to this message (as described in detail above) (block 491). If an eligible custodian 14 is available (e.g., the passage of time changed the evaluation of one or more variables), the queue manager 134 removes the message from the queue 132 and control proceeds to block 408 (FIG. 20).

If the apparatus 10 is unable to respond to this message at this time (i.e., no matching answers in the knowledge database 136 and no available information custodians 14), the queue manager 134 determines if the current message has been pending for longer than a predetermined period of time (block 492). Preferably, the queue manager 134 make this determination by cooperating with the message mapper 126 to subtract the value of the "Asked" timestamp field in the message map database 118 from the current date and by comparing the result to a predetermined time period (e.g., 10 days). The predetermined time period may be fixed for all messages or it may be defined by the information request message 18. If the time limit has not expired, the queue manager 134 determines if there are more pending messages to consider (block 498). If so, the queue manager 134 increments the loop counter (block 499), retrieves the next message from the queue 132 (block 488), and repeats the process. The queue manager 134 continues to loop until there are no more pending messages to consider. Each time an expired message is found, the queue manager 134 directs the message composer 122 (in cooperation with the router 114) to notify the information requester 12 that the time limit has expired (block 494). Preferably, the queue manager 134 deletes or otherwise marks the corresponding record in the queue 132 (block 496). When there are no more pending messages to consider, control returns to block 202 (FIG. 16) for receipt and processing of the next message.

Message Currency

In order to encourage non-advertising information custodians 14 to associate themselves with one or more categories, a question "currency" may optionally be enforced by the apparatus 10. For example, a parent who happens to be an accountant could "buy" fifty questions for his child (on any topics) by promising to answer twenty-five questions on taxes from other parents and twenty-five questions on math from other children. It may be more efficient for the parent in the above example to answer an accounting question for a stranger than it is for him to answer a zoology question for his child. Further, the child will typically receive a better answer from an appropriate information custodian 14, than he would from his parent. As a further example, a large engineering company could "donate" five-thousand questions a year to a local school by promising to answer five-thousand questions a year (on various selected topics) from anyone with "currency". Of course, volunteers need not designate a recipient for their donation, they could simply donate to the apparatus 10 which would in turn distribute the "currency" in some fair manner (e.g., to the public school system, to libraries, and/or as bonuses to certain information custodians 14). Of course, supply and demand may make it necessary to "pay more" for answers to questions in certain categories. For example, a user may have to answer two and one-third sports questions to get one medical answer.

In summary, persons of ordinary skill in the art will readily appreciate that apparatus and methods for facilitating electronic information exchange over a network have been provided. People using systems implementing the teachings of the present invention can enjoy efficient one-to-one communication with an expert, willing and able to answer a particular question, without the need to know that expert's name or address. Further, people using systems implementing the teachings of the invention can enjoy a single source database for efficient searching of previously asked and answered questions regardless of the question's frequency or topic. Additionally and/or alternatively, persons using such systems can efficiently solicit bids and/or offer to sell items to interested parties.

The foregoing description has been presented for the purposes of illustration and description. It is not intended to be exhaustive or to limit the invention to the precise form disclosed. Persons of ordinary skill in the art will readily appreciate that many modifications and variations are possible in light of the above teachings. The scope of the invention is not limited by this detailed description. Instead, the invention covers all apparatus and methods falling within the scope of one or more of the claims appended hereto.

What is claimed is:

1. Apparatus for facilitating information exchange between an information requester and an information custodian via a network, the apparatus comprising:
   an input coupled to the network;
   a first database mapping a plurality of information custodians to a plurality of categories;
   a selector in communication with the first database and the input for identifying one of the categories in the plurality of categories as being associated with an information request message received via the input from an information requestor and for selecting a subset including at least one information custodian from the plurality of information custodians, the at least one information custodian being associated with the identified category, the selector automatically selecting the subset based on historical statistical data associated with the at least one information custodian in the subset; and
   a router in communication with the selector for transmitting an answer request message including at least a portion of the information request message to the at least one information custodian via the network.

2. An apparatus as defined in claim 1 wherein the selector selects the subset by evaluating the historical statistical data in accordance with at least one variable defined by the at least one information custodian.

3. An apparatus as defined in claim 1 wherein the information request message comprises an e-mail message.

4. An apparatus as defined in claim 1 wherein the network comprises the Internet.

5. An apparatus as defined in claim 1 wherein the network comprises an intranet.

6. An apparatus as defined in claim 1 wherein the information request message includes a predefined field identifying an initial category and the selector identifies the identified category by reading the predefined field.

7. An apparatus as defined in claim 6 wherein the initial category is unidentified.

8. An apparatus as defined in claim 7 wherein the at least one information custodian in the subset is mapped to the unidentified category in the plurality of categories.

9. An apparatus as defined in claim 1 wherein the information requestor has an identity and the answer request message excludes the identity of the information requester.

10. An apparatus as defined in claim 9 further comprising a message mapper for recording the identity of the information requester in association with the answer request message in a message map database.

11. An apparatus as defined in claim 10 further comprising a message type identifier to distinguish information request messages received from information requesters from intermediate answer messages received from information custodians.

12. An apparatus as defined in claim 11 further comprising a message composer which cooperates with the message type identifier, the message map database and the router to transmit a final answer message to the information requestor associated with the information request message, the final answer message comprising at least a portion of an intermediate answer message received from the at least one information custodian in response to the answer request message.

13. An apparatus as defined in claim 12 wherein the at least one information custodian has an identity and the final answer message excludes the identity of the at least one information custodian from the final answer message.

14. An apparatus as defined in claim 13 wherein the message mapper records the identity of the at least one information custodian in association with the final answer message to facilitate routing a follow-up information request message from the information requester to the at least one information custodian.

15. An apparatus as defined in claim 1 further comprising a message type identifier to distinguish re-route messages received from the information custodian from information request messages received from the information requester and intermediate answer messages received from the information custodian.

16. An apparatus as defined in claim 15 wherein, when the message type identifier identifies a re-route message, the message type identifier cooperates with the selector and the router to identify a new identified category associated with the re-route message, to automatically select a new at least one information custodian associated with the new identified category, and to re-route the answer request message to the new at least one information custodian.

17. An apparatus as defined in claim 1 wherein the historical statistical data comprises financial data.

18. An apparatus as defined in claim 1 wherein the historical statistical data comprises a number of answer request messages a given information custodian has received within a predefined time period.

19. An apparatus as defined in claim 18 further comprising a history recorder for recording the dates on which the answer request messages were routed to each of the information custodians.

20. An apparatus as defined in claim 1 wherein the selector limits the number of answer request messages routed to a given information custodian.

21. An apparatus as defined in claim 20 wherein the selector limits the number of answer request messages routed to the given information custodian based upon a variable set by the given information custodian, the variable defining a maximum number of answer request messages the given information custodian agrees to receive during a predefined time period.

22. An apparatus as defined in claim 20 wherein the selector limits the number of answer request messages routed to the given information custodian based upon a variable set by the given information custodian, the variable defining the time period during which the given information custodian can receive no more than a predefined number of answer request messages.

23. An apparatus as defined in claim 1 further comprising a second database and a database manager, the database manager cooperating with the second database to store at least portions of final answer messages.

24. An apparatus as defined in claim 23 wherein the database manager stores information request messages received from information requesters in association with responsive intermediate answer messages received from information custodians in the second database.

25. An apparatus as defined in claim 23 wherein the database manager stores information request messages received from information requesters in association with responsive final answer messages received from information custodians in the second database.

26. An apparatus as defined in claim 24 wherein, upon receipt of the information request message from the information requestor, the database manager searches the second database for a similar information request message in the second database, and, upon identification of a similar information request message routes a final answer message associated with the similar information request to the information requester without routing an answer request message to an information custodian.

27. An apparatus as defined in claim 1 wherein the router transmits a final answer message to the information requestor associated with the information request message, the final answer message comprising at least a portion of an intermediate answer message received from the at least one information custodian in response to the answer request message.

28. An apparatus as defined in claim 1 wherein the information request message and the answer request message each comprise an e-mail message.

29. A method for facilitating electronic information exchange between at least one information custodian and an information requestor over a network, the method comprising the steps of:

providing an exchange facilitating computing device having a first address on the network;

defining a first category of information and a second category of information;

associating a first and a second information custodian with the first category, the first information custodian having a second address on the network which is different from the first address, the second information custodian having a third address on the network which is different from the first and the second addresses;

receiving an information request message indicative of a request for information from a first information requestor at the exchange facilitating computing device via the network, the first information requester having a fourth address on the network which is different from the first, second and the third addresses;

determining whether the information request message is associated with the first category or the second category;

if the information request message is associated with the first category, automatically selecting one of the first and second information custodians as a receiving custodian based on predetermined historical data; and routing at least a portion of the information request message from the first address to the receiving custodian.

30. A method as defined in claim 29 wherein the information request message comprises an e-mail message.

31. An apparatus for facilitating information exchange between an information requestor and an information custodian via a network comprising:

an input coupled to the network;

a database mapping a plurality of information custodians to a plurality of categories;

a selector in communication with the database and the input, the selector being responsive to an information request message received from an information requestor via the input to automatically select a subset including at least one information custodian from the plurality of information custodians based on historical statistical data, the historical statistical data being associated with the at least one information custodian in the subset, the at least one information custodian being associated with at least one of the categories in the plurality, the at least one category being associated with the information request message; and a router for transmitting an answer request message including at least a portion of the information request message to the at least one information custodian in the subset.

* * * * *